US012807010B2

(12) United States Patent
McAlwee et al.

(10) Patent No.: US 12,807,010 B2
(45) Date of Patent: Nov. 24, 2026

(54) ELECTRIC VEHICLE CHARGING STATIONS (EVCS) WITH GALVANICALLY ISOLATED DIRECT CURRENT (DC) LINKS AND RELATED METHODS

(71) Applicant: Positive Energy Inc., Miami, FL (US)

(72) Inventors: Gerald Steven McAlwee, Long Beach, CA (US); Vincent Benini, Aventura, FL (US)

(73) Assignee: Positive Energy Inc., Miami, FL (US)

( * ) Notice: Subject to any disclaimer, the term of this patent is extended or adjusted under 35 U.S.C. 154(b) by 849 days.

(21) Appl. No.: 18/142,649

(22) Filed: May 3, 2023

(65) Prior Publication Data

US 2023/0356607 A1 Nov. 9, 2023

Related U.S. Application Data

(60) Provisional application No. 63/338,396, filed on May 4, 2022.

(51) Int. Cl.
*H01M 10/44* (2006.01)
*B60L 53/10* (2019.01)
(Continued)

(52) U.S. Cl.
CPC ............... *B60L 53/11* (2019.02); *B60L 53/57* (2019.02); *B60L 53/67* (2019.02); *H02J 7/50* (2026.01);
(Continued)

(58) Field of Classification Search
CPC ..... H02J 7/50; H02J 7/00; B60L 53/11; B60L 53/57; B60L 53/67; B60L 53/53;
(Continued)

(56) References Cited

U.S. PATENT DOCUMENTS

| | | | |
|---|---|---|---|
| 9,637,011 | B2 | 5/2017 | Biagini |
| 2017/0093157 | A1 | 3/2017 | Pierquet et al. |
| 2023/0117407 | A1 | 4/2023 | Quattrini et al. |

FOREIGN PATENT DOCUMENTS

| | | | | |
|---|---|---|---|---|
| DE | 102021100553 A1 * | 8/2021 | | H02J 7/56 |
| WO | WO-2021092658 A1 * | 5/2021 | | H02J 3/17 |
| WO | WO-2022003441 A1 * | 1/2022 | | H02J 13/13 |

OTHER PUBLICATIONS

[No Author Listed], Reference design: 5kW Isolated Bidirectional DC-DC Converter. Using SiC MOSFETs to improve the efficiency of power supply systems. Toshiba Electronic Devices & Storage Corporation. 2021. 13 pages.
[No Author Listed], The SPOT: Alencon's PV String Level DC-DC Optimizer. Allencon. 2022. 2 pages.
[No Author Listed], The BOX: Cost Effective, Centralized Solution for Galvanically Isolated DC:DC Power Conversion. Allencon. 2021. 2 pages.
(Continued)

*Primary Examiner* — Edward Tso
(74) *Attorney, Agent, or Firm* — Wolf, Greenfield & Sacks, P.C.

(57) ABSTRACT

Electric vehicle charging station (EVCS) are described. These stations can dynamically switch between different charge modes depending upon the needs of the station operator and its customers. For example, each charger of an EVCS can be switched between an independent charging mode, a parallel charging mode, a sequential charging mode and a vehicle-to-vehicle changing mode. The architectures described herein rely on DC-coupled EV chargers to provide a more efficient and lower cost approach for delivering power to vehicles while enabling different charging modes. These architectures are particularly suitable for use in fleet charging stations— charging stations installed at commercial or industrial locations that include multiple charge points—and freeway charging stations—charging stations located every 25 to 100 miles along a freeway. Using a common inverter in conjunction with multiple DC-DC converters improves the scalability of a fleet charging station at a much lower cost relative to conventional architectures.

18 Claims, 22 Drawing Sheets

Independent Charging Mode

Parallel Charging Mode

(51) Int. Cl.
*B60L 53/57* (2019.01)
*B60L 53/67* (2019.01)
*H01M 10/46* (2006.01)
*H02J 7/50* (2026.01)

(52) U.S. Cl.
CPC ....... *B60L 2210/10* (2013.01); *B60L 2210/30* (2013.01)

(58) Field of Classification Search
CPC ............. B60L 2210/10; B60L 2210/30; Y02T 10/7072; Y02T 90/14; Y02T 10/70
USPC ................. 320/104, 107, 109, 116, 117, 134
See application file for complete search history.

(56) References Cited

OTHER PUBLICATIONS

[No Author Listed], The BOSS: Alencon's Unique Bi-Directional DC-DC Converter for Battery Energy Storage Systems. Allencon. V7. 2 pages.

[No Author Listed], Creating the Gas Station of the Future with American Made, Galvanically Isolated DC:DC Converters. Allencon Systems, LLC. 2021. 7 pages.

[No Author Listed], The ACE: Granular Monitoring and Control for Your Alternative Energy Assets. Allencon. 2 pages.

Kubel, Design Guide for Combined Charging System. Daimler. Feb. 2015. 6. 131 pages.

Thomas et al., Electric Vehicle Integration to Distribution Grid Ensuring Quality Power Exchange. International Conference on Power, Signals, Controls and Computation (EPSCICON). Jan. 2014. 8. 7 pages.

* cited by examiner

Parallel Charging Mode

Parallel Charging Mode

1700

Independent Charging/Discharging Mode

Parallel Charging/Discharging Mode

Parallel Charging/Discharging Mode

ELECTRIC VEHICLE CHARGING STATIONS (EVCS) WITH GALVANICALLY ISOLATED DIRECT CURRENT (DC) LINKS AND RELATED METHODS

CROSS-REFERENCE TO RELATED APPLICATIONS

This application claims the benefit under 35 U.S.C. § 119(e) of U.S. Provisional Application Ser. No. 63/338,396, filed on May 4, 2022, entitled "ELECTRIC VEHICLE CHARGING STATIONS (EVCS) WITH GALVANICALLY ISOLATED DIRECT CURRENT (DC) LINKS AND RELATED METHODS," which is hereby incorporated herein by reference in its entirety.

FIELD OF THE DISCLOSURE

The technology described in the present application relates to electric vehicle charging stations (EVCS).

BACKGROUND

Electric vehicle supply equipment (EVSE) is a piece of equipment that supplies electrical power for charging plug-in electric vehicles or through inductive non-contact interfaces. Conventional EVSEs are designed in accordance with one of the following types: level 1, level 2, or DC fast charging (DCFC). Level 1 equipment generally provides charging through a 120 V alternating current (AC) plug. Level 1 equipment is typically used when there is only a 120 V outlet available, such as while charging at home. Typically, 8 hours of charging at 120 V can replenish about 40 miles of electric range for a mid-size electric vehicle.

Level 2 equipment offers charging through 240 V or 208 V, depending on whether the setting is residential or commercial. For example, some homes have 240 V service available. Level 2 equipment can charge a typical electric vehicle battery overnight, therefore level 2 is often the preferred equipment by homeowners. Level 2 equipment is also commonly used for public and workplace charging. Level 2 can operate at up to 80 A (thus supplying 19.2 kW). However, most residential Level 2 equipment operates at lower power, such as at 30 A (thus supplying 7.2 kW).

DCFC equipment enables fast charging along heavy traffic corridors at installed stations by supplying direct current (DC) voltage. DCFC equipment is significantly faster than level 1 and level 2 charging stations, taking between 20 and 40 minutes to charge most passenger electric vehicles up to 80 percent.

The compound annual growth rate (CAGR) for electric vehicle (EV) chargers is expected to be consistent at around 41% through 2030. Initial years will likely see over 100% market growth, particularly in fleet applications, e.g.—school buses, municipal transit buses, delivery, and service vehicles.

SUMMARY OF THE DISCLOSURE

Some aspects of the present technology relate to an electric vehicle charging station (EVCS) comprising: a direct current (DC) link; and a plurality of chargers coupled to the DC link, wherein at least one charger of the plurality of chargers comprises: a first DC-DC converter and a second DC-DC converter, each of the first and second DC-DC converters having a link side coupled to the DC link and a vehicle side; a first switch coupling the vehicle side of the first DC-DC converter to a first port of the at least one charger; a second switch coupling the vehicle side of the second DC-DC converter to a second port of the at least one charger; a third switch coupling the vehicle side of the first DC-DC converter to the second port of the at least one charger.

Other aspects of the present technology relate to a method for controlling an electric vehicle charging station (EVCS) comprising a direct current (DC) link, a plurality of chargers coupled to the DC link, wherein at least one charger of the plurality of chargers comprises a first DC-DC converter and a second DC-DC converter, each of the first and second DC-DC converters having a link side coupled to the DC link and a vehicle side, the method comprising: placing the at least one charger in an independent charging mode by: enabling a first switch coupling the vehicle side of the first DC-DC converter to a first port of the at least one charger, enabling a second switch coupling the vehicle side of the second DC-DC converter to a second port of the at least one charger, and disabling a third switch coupling the vehicle side of the first DC-DC converter to the second port of the at least one charger; and placing the at least one charger in a parallel charging mode by enabling the first and third switches, and by disabling the second switch.

Other aspects of the present technology relate to a method for controlling an electric vehicle charging station (EVCS) comprising a direct current (DC) link, a plurality of chargers coupled to the DC link, wherein at least one charger of the plurality of chargers comprises a first DC-DC converter and a second DC-DC converter, wherein the at least one charger of the plurality of chargers has first and second ports that can be connected to a respective vehicle, the method comprising: placing the at least one charger in an independent charging mode by: using the first DC-DC converter to charge a battery of a first vehicle connected to the first port, using the second DC-DC converter to charge a battery of a second vehicle connected to the second port, placing the at least one charger in a parallel charging mode by: using the first DC-DC converter to charge a battery of a third vehicle connected to the first port, using the second DC-DC converter to charge the battery of the third vehicle.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

I. Overview

Figure 1:
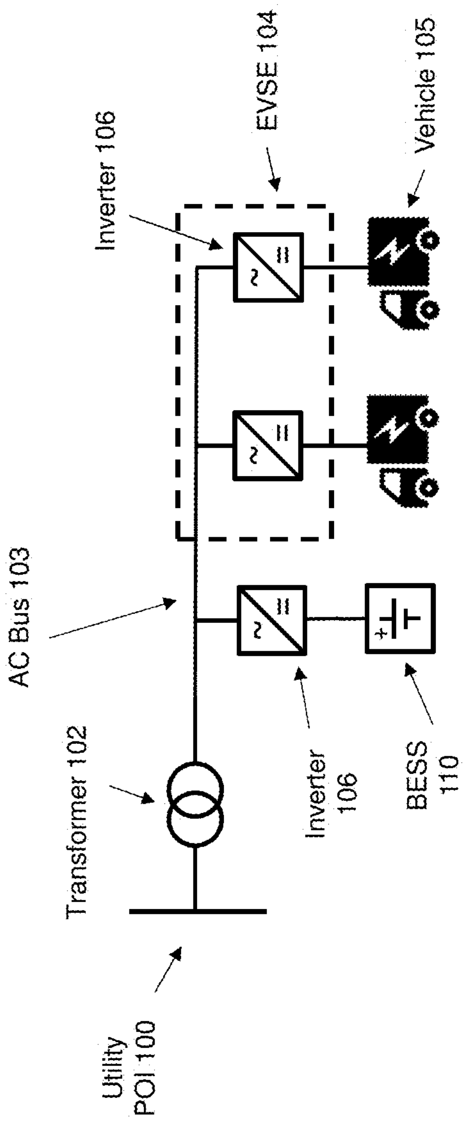
FIG. 1 is a block diagram illustrating a conventional AC-coupled EVCS.

The inventors have developed novel architectures for next-generation EVCS that can dynamically switch between different charge modes depending upon the needs of the station operator and its customers. For example, each charger of an EVCS can be switched between an independent charging mode, a parallel charging mode, a sequential charging mode and a vehicle-to-vehicle changing mode. The chargers of an ECVS may be controlled independently of one another, allowing each charger to be operated in a different mode as needed.

In the independent charging mode, each charging unit of a particular charger is allocated to charge a different vehicle. In this mode, each vehicle connected to the charger is charged regardless of the other vehicles. In the parallel charging mode (also referred to as "split" charging mode), multiple (e.g., all) charging units of a particular charger are allocated to charge one particular vehicle. The parallel charging mode may be useful in circumstances in which a user wishes to have a vehicle charged in a particularly short period of time and/or in circumstances in which the voltage requirements of a vehicle exceed the voltage output of a single charging unit. In one example, the parallel charging mode extends the capability of a charger to large trucks. The sequential charging mode may be used when two vehicles are connected to a charger simultaneously, and may involve fully charging one of the vehicles first, and subsequently, the other vehicle. In some embodiments, the sequential charging mode may involve determining when the battery of the first vehicle has been sufficiently charged (e.g., has reached threshold value of charge), and subsequently, using all the charging units of the charger to charge the second vehicle. Lastly, in the vehicle-to-vehicle charging mode, vehicles connected to a common charger may charge one another, e.g., without drawing current from the grid.

The architectures developed by the inventors and described herein rely on DC-coupled EV chargers to provide a more efficient and lower cost approach for delivering power to vehicles while enabling different charging modes. These architectures are particularly suitable for use in fleet charging stations—charging stations installed at commercial or industrial locations that include multiple charge points—and freeway charging stations—charging stations located every 25 to 100 miles along a freeway.

The inventors have appreciated that using a common (shared) inverter in conjunction with multiple DC-DC converters allows a cost reduction in terms of $/kW for AC-DC power conversion, and can lead up to 67% less copper or aluminum use in power distribution between the inverter and individual charging stations. Additionally, using a common inverter in conjunction with multiple DC-DC converters improves the scalability of a fleet charging station at a much lower cost relative to conventional architectures. Adding system capacity using the approach described herein (referred to as "micro-grid approach") allows for a more flexible and lower cost increase in charging capability without having to update the grid connection. Adding more chargers simply translates into extending the DC link (the medium that provides DC power to the chargers) and control power cables, and connecting one or more additional chargers.

In some embodiments, the architectures described herein leverage commercially available battery energy storage system (BESS) in either a reverse DC-coupled (direct to the DC link) or traditionally DC-coupled configuration to extend the capabilities of an EVCS. The inventors have recognized that connecting a BESS to the DC link is an effective way to buffer the energy flow from the grid, which can help manage utility costs. Use of BESS further allows sizing an inverter to be smaller than the aggregated maximum load capability of all the chargers. Further, the approach described herein eliminates the need to update grid interconnection permits when adding additional charging stations because the common inverter would not change. Additionally, DC-coupled chargers can be installed above ground by a certified installer with DC cables in a 3R rated conduit/tray. Unlike in AC-coupled chargers, only the grid connection of the AC inverter may be required to be done by a licensed electrician.

The inventors have further appreciated that using bi-directional DC-DC converters opens the door to vehicle-to-grid (V2G) applications, in which pre-charged vehicle batteries supply electric energy back to the grid for various needs including resilience, frequency regulation, and Volt-Var reactive power management. All are essential to maximize the capability of existing grid infrastructure. An example of a DC-DC converter that enables bi-directionality is a four-switch buck-boost DC-DC converter. These types of converters allow for greater flexibility in working with a wider input and output voltage range, and simplify the control development when the converter crosses-over and the power flow direction changes. Using bi-directional converters with robust high bandwidth phase and gain margin stability allows electric vehicles to provide grid connected market ancillary services as well as help provide Volt-Var reactive power management of facility power for improved quality and utilization efficiency.

The inventors have further appreciated that connecting multiple chargers to a common inverter poses significant risks from a safety perspective. When the grounds of different circuits are at different electrical potentials, ground loops can form. Ground loops can produce large currents that can be harmful (if not lethal) to humans. The inventors have developed architectures that rely on galvanically isolated DC-DC converters to reduce the risk of forming ground loops. Galvanic isolation allows each charger to prevent damage caused by shorts. Galvanic isolation further provides safety for operators when the pavement is wet or when there could be inadvertent coupling of equipment between two vehicles. Galvanic isolation further reduces electronic noise, thereby making these architectures less likely to face regulatory (e.g., FCC) compliance issues. Conventional galvanically isolated DC-DC converters based on silicon insulated-gate bipolar transistors (IGBT) are unsatisfactory for the use described herein because of their relatively large size and relatively large heat generation. Instead, some embodiments use galvanically isolated DC-DC converters based on metal-oxide-semiconductor field effect transistors (MOSFET) made of wide bandgap materials (e.g., having a bandgap greater than 3 eV), such as silicon carbide (SiC) or gallium nitride (GaN), among others. These types of transistors are significantly smaller and generate significantly less heat that their silicon counterparts. Wide bandgap materials offer substantial reduction in conduction losses relative to conventional materials, thereby allowing a much higher switching frequency which leads to a significant reduction in the size of the inductor. Allowing fully isolated DC-DC designs to achieve high power density without the burden of complex cooling makes a reasonably sized charging station to achieve over 97% efficiency.

The architectures described herein can be used in a variety of applications, including for example in a system including a set of individual charging stations all connected by a DC-link, BESS, a grid-tied inverter, and a DC-DC converter connected to any renewable generation source including solar/photovoltaic (pV) arrays and/or wind-power elements. Further, any other generation source including fuel cells or conventional combustion-type generators can be used in such a Micro-Grid architecture. As another example, these architectures can be used in off-grid settings requiring at least one source of energy, e.g., solar (with or without storage), storage-only, wind (with or without storage), etc. As yet another example, these architectures can be used in vehicle-to-vehicle mobile chargers. DC-coupled chargers of the types described herein are more suitable for use with renewable power sources than conventional AC-coupled chargers. In fact, unlike AC-coupled chargers, DC-coupled chargers enable clipping recapture, curtailment recapture and low-voltage harvest when solar power sources are part of the system.

II. DC-Coupled EVCS

FIG. 1 is a block diagram illustrating a conventional AC-coupled EVCS. The system includes a transformer (XFMR) 102 connected to a utility point of interconnection (POI) 100, typically a three-phase AC line. The output of the transformer 102 supplies an AC bus 103 with 480 VAC (volts alternating current). Thus, the bus supplies each charger of the station with 480 VAC. Each charger location (EVSE 104) includes an inverter 106 performing AC-DC conversion. The DC-side of the inverter 106 provides between 200 VDC (voltage direct current) and 920 VDC, the DC voltage being selected depending upon the vehicle battery 105. These voltage ranges are flexible and only limited by the component limits within the system. Additionally, some systems include a BESS 110 connected to the AC bus through a dedicated inverter.

This architecture presents several limitations. First, it draws vast amounts of current, in a way that is not sustainable. Second, it does not enable off-grid schemes powered by renewable sources because AC-coupled chargers do now allow for clipping recapture, curtailment recapture and low-voltage harvest from renewable sources. Third, this architecture does not provide for flexible scaling. Costly upgrades in the grid infrastructure are necessary in order to deploy a new charger or to expand the capacity of an existing charger.

Figure 2:
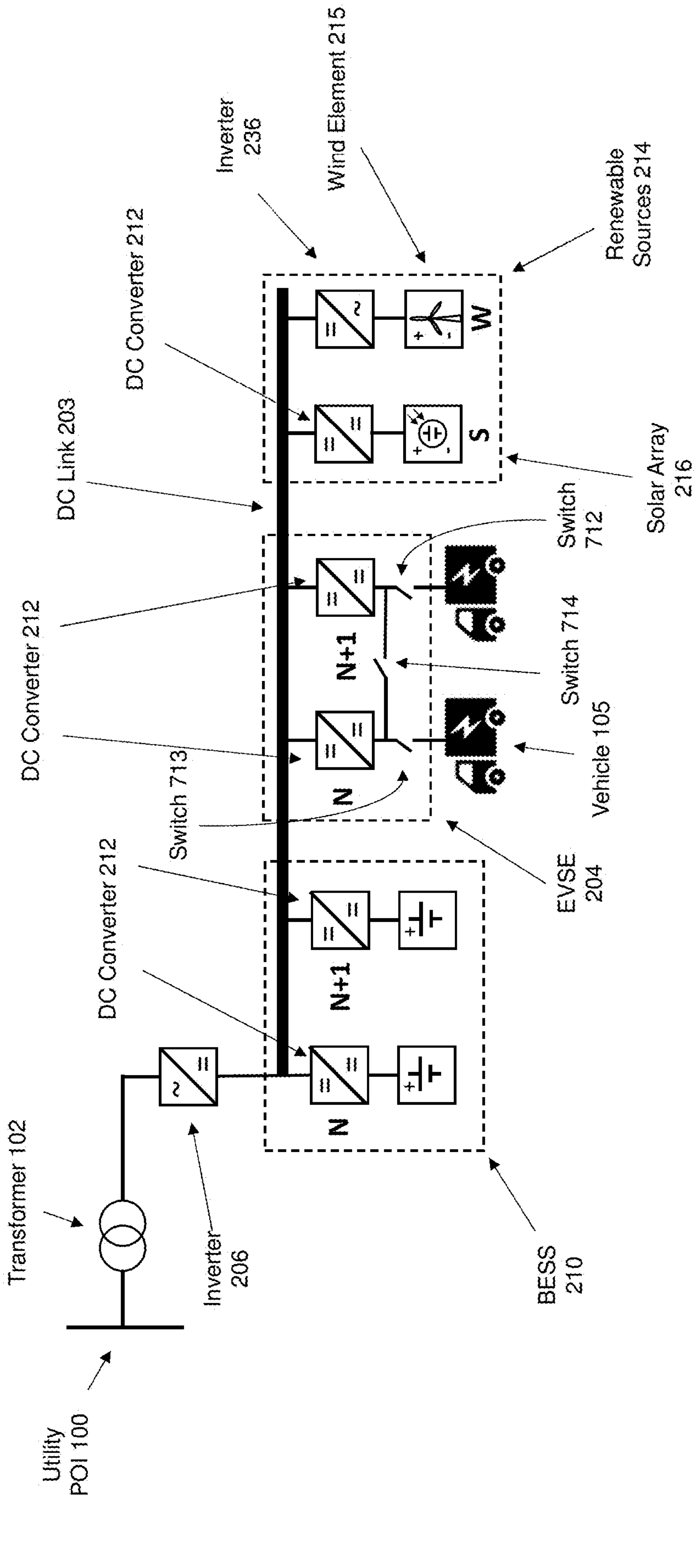
FIG. 2 is a block diagram illustrating a DC-coupled EVCS, in accordance with some embodiments.

The architecture developed by the inventors, an example of which is shown in FIG. 2, addresses at least some of the limitations listed above. This EVCS includes a transformer (XFMR) 102 connected to a utility POI 100, which can be a single-phase AC line or a three-phase AC line. The output can be 480 VAC, but is not limited to this voltage. The output can also be 600 VAC and 690 VAC, among other examples. A common (shared) inverter 206 performs AC-DC conversion. The line bus connected to the DC-side of the inverter is referred to as the DC link 203 (or DC bus 203). The voltage supported by the DC link 203 may be for example between 1 and 1.5 kV, at least in some embodiments. Each charger 204 (also referred to as EVSE) connects to the DC link 203 through a dedicated DC-DC converter 212. Although only one EVSE 204 is shown in FIG. 2, multiple EVSEs 204 may be connected to DC link 203 in some embodiments. Each DC-DC converter 212 transforms (e.g., reduces) the voltage provided by the DC link 203 to a voltage suitable for charging a vehicle battery 105. Having a DC-DC converter for each charger allows for greater flexibility in terms of satisfying the voltage requirements of each individual vehicle battery connected to the station. As discussed in detail further below, DC-DC converters allow for different charging modes, such as independent, parallel, vehicle-to-vehicle, sequential charging and dynamic charging.

Notably, the DC-DC converters are galvanically isolated. Galvanic isolation prevents the formation of ground loops and results in the chargers being effectively disconnected from one another, thus preventing the occurrence of dangerous situations for humans. In some embodiments, the DC-DC converters are bi-directional, meaning that either side of the converter can be the input or the output. This feature opens new opportunities, such as V2G, in which vehicle batteries are used as units for storing and supplying electric energy outside the EVCS. The bi-directional nature of the DC-DC converters further allows for schemes in which the energy stored in the battery of a vehicle connected to a charger can be used to charge the battery of another vehicle. Specific DC-DC converter implementations are described in detail further below.

Each charger 204 may include two or more DC-DC converters 212. The example of FIG. 2 depicts a representative EVSE having two DC-DC converters. In this example, each DC-DC converter is depicted as being coupled to the vehicles 105 through a respective switch (712 and 713) to indicate that the connection can be enabled or disabled as needed. A further switch 714, when closed, connects a pair of DC-DC converters together. This allows a higher single and parallel DC-DC power level per output cable, when desired. Thus, when the switch is open, each DC-DC converter may charge a distinct vehicle (the independent charging mode). When the switch is closed, the outputs of both DC-DC converters are combined to charge one vehicle (the parallel charging mode). An additional switch (711, shown below in FIG. 7A but not shown in FIG. 2) may switchably couple DC link 203 to EVSE 204. A more detailed discussion of the operation of the switches is provided further below in connection with FIGS. 7A-7H. It should be noted that more than two DC-DC converters may be combined together to charge a single vehicle using switches, as this arrangement is not limited to two DC-DC converters.

One or more BESS 210 may be connected to the DC link 203, either through dedicated DC-DC converters 212 (as shown in FIG. 2) or directly, depending on the BESS voltage output relative to the voltage present at the DC link. In some embodiments, the body of a BESS may be enclosed within a U-rack or a rack mounted battery module. In some embodiments, a battery enclosure may have as many as ten (or more) electrically separate battery systems, allowing for robust operational reliability and flexibility. Power and energy management can be implemented as "stand-alone" with simple daily time-of-use (TOU) and power level for recharge scheduling or as "fully integrated" with a facility and its advanced dispatch controller for maximum ROI within a given electric tariff structure.

DC-coupled architectures of the types depicted in FIG. 2 allow for integration with renewable sources 214 such as photovoltaic and wind generators. Renewable sources may be connected to the DC link directly, through a DC-DC converter, through an inverter and/or through a BESS. The example of FIG. 2 shows a solar/photovoltaic (pV) array 216 coupled to the DC link 203 through a DC-DC converter 212 and a wind power element 215 coupled to the DC link 203 through an inverter 236 (since wind produces AC power).

Figure 3:
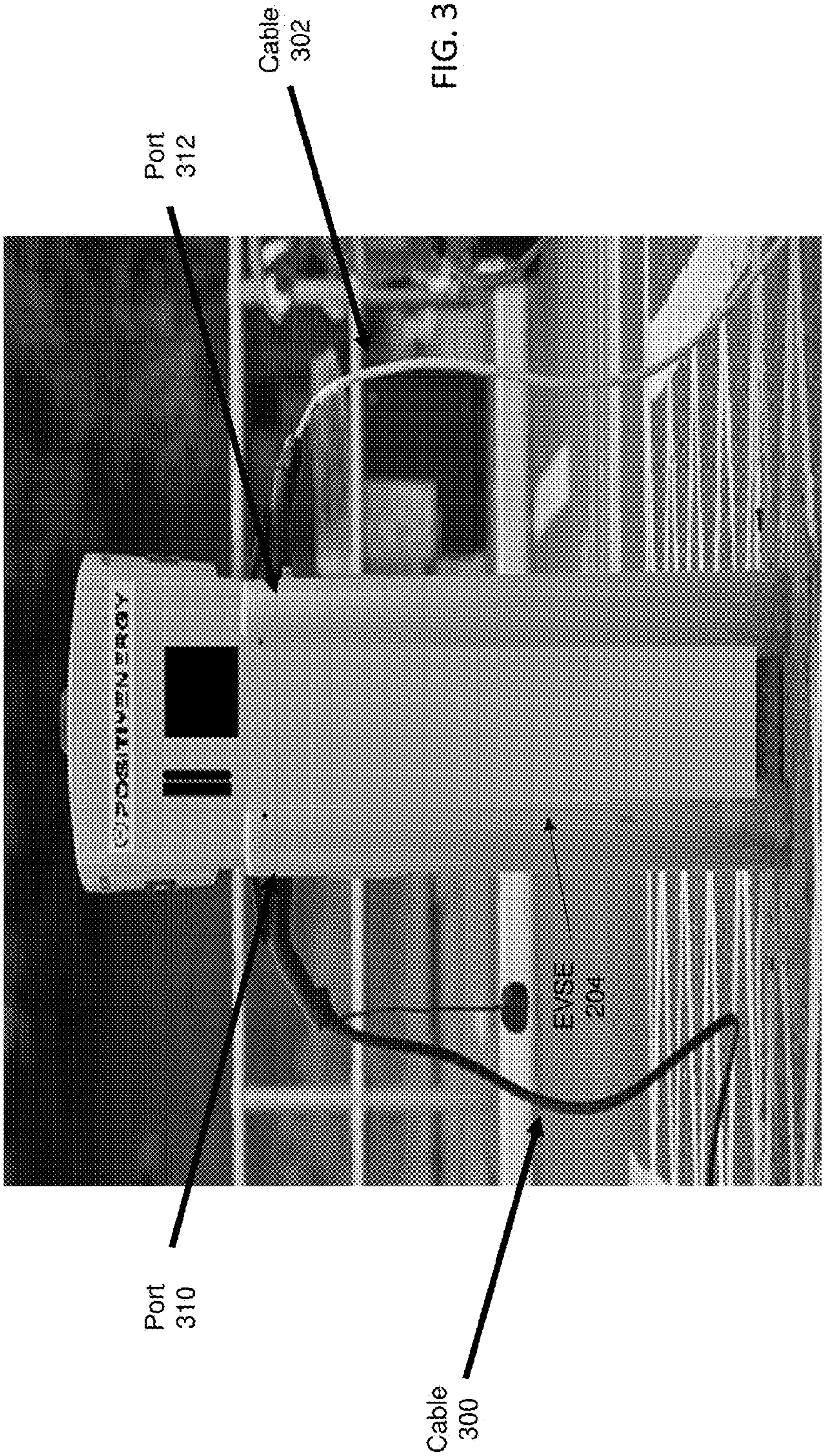
FIG. 3 is a schematic diagram illustrating an EVSE, in accordance with some embodiments.

FIG. 3 shows a representative EVSE 204, in accordance with some embodiments. Each EVSE 204 may include two or more DC-DC converters (e.g., two DC-DC converters). In the arrangement of FIG. 3, the EVSE 204 includes two charging cables 300 and 302 disposed on opposite sides of the charger's chassis. Cable 300 connects to the circuitry of charger 204 via port 310 and cable 302 connects to the circuitry of EVSE 204 via port 312. In some embodiments, more than one of the DC-DC converters of a charger can be assigned to a single vehicle in a parallel fashion. Thus, for example, a charger including a pair of DC-DC converters configured to supply 80 kW each can deliver up to 160 kW to a vehicle connected to that unit. Alternatively, one DC-DC converter of a charger may be assigned to a first vehicle and another DC-DC converter of the same charger may be assigned to a second vehicle parked next to the first vehicle. In some embodiments, the DC-DC converters of a charger may charge the respective vehicle battery in accordance with a sequential mode or simultaneously. In the sequential mode, one vehicle is charged at a time. The other charging units connected to the DC link can operate in a similar way. For example, while a first charger is independently charging two vehicles, another charger may be charging one vehicle using both its DC-DC converters in parallel. Once one of the vehicle batteries has been fully charged, the first charger may be switched to charge yet another vehicle. The ability to assign DC-DC converters in different ways depending on the requirements of the network provides improved flexibility over conventional approaches.

Overall, DC-coupled architectures provide significant improvements over conventional AC-coupled architectures, as shown in the following table.

| Power Delivery - Efficiency Comparison | | | | |
|---|---|---|---|---|
| | EV Charger Type | | DC-Coupled to AC-Coupled Metrics | |
| Power Flow | AC-Coupled | DC-Coupled | Relative Improvement | Reduction in Copper |
| Grid-Vehicle | 92.5% | 92.5% | 0.0% | >20 to 30% |
| Grid-Battery-Vehicle | 86.2% | 89.9% | 4.2% | XFMR to Inverter Cables |
| PV-Battery-Vehicle | 85.8% | 90.3% | 5.2% | >67% Inverter to Charger Cables |

III. DC-DC Converters

Figure 4:
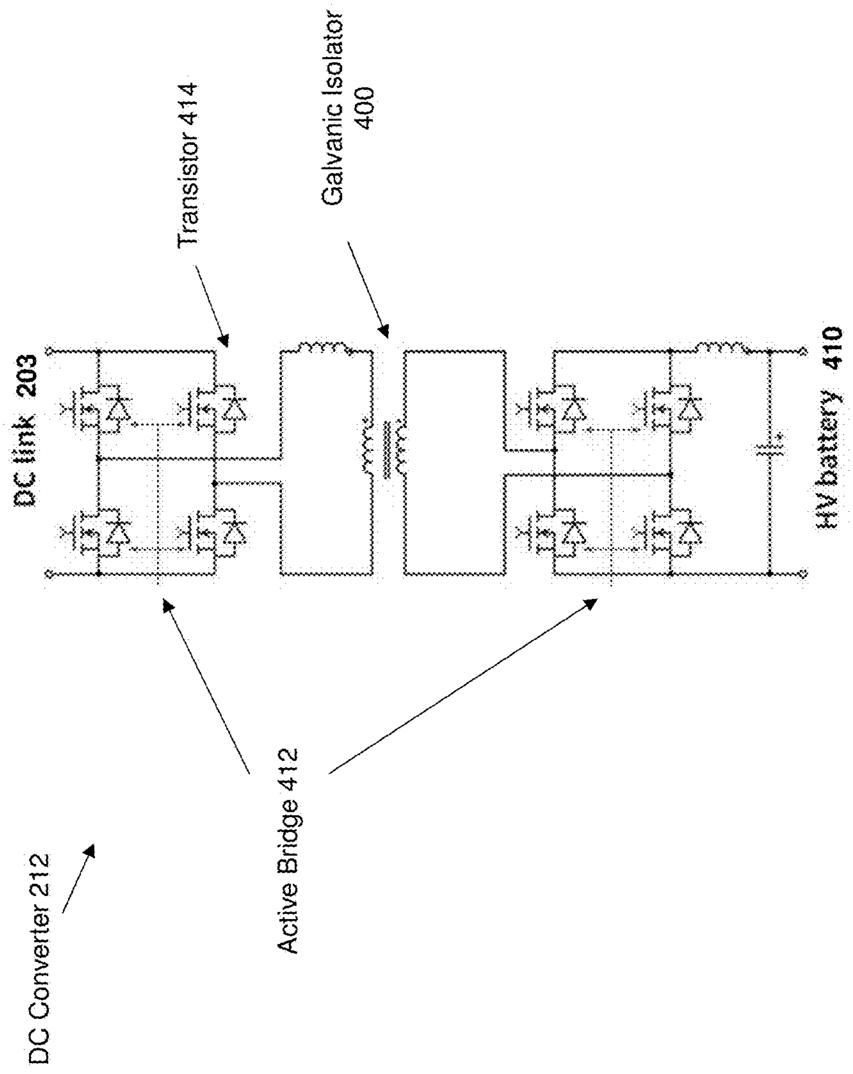
FIG. 4 is a block diagram illustrating an example of a DC-DC converter, in accordance with some embodiments.

FIG. 4 is a circuit diagram illustrating an example of a DC-DC converter that may be used in connection with the architecture of FIG. 2, at least in some embodiments. The DC-DC converter is galvanically isolated (see galvanic isolator 400), and operates at relatively high frequencies, thus allowing a significant size reduction. The design of the DC-DC converter is symmetrical, meaning that it can support bi-directional conversion, either a reduction from DC link 203 to a high voltage (HV) battery 410 or a reduction from HV battery 410 to DC link 203. The DC-DC converter may be implemented in accordance with a dual active bridge (DAB) architecture (having a pair of active bridges). Each active bridge couples the galvanic isolator to the respective end of the DC-DC converter. In some embodiments, the transistors 414 of the active bridges are implemented using wide bandgap material-based MOSFETs, though other transistors are also possible. Wide bandgap material-based MOSFETs provide substantial reductions in conduction losses relative to conventional materials, thereby allowing a much higher switching frequency and cooler-free operation. Examples of such materials include SiC and GaN.

Figure 5:
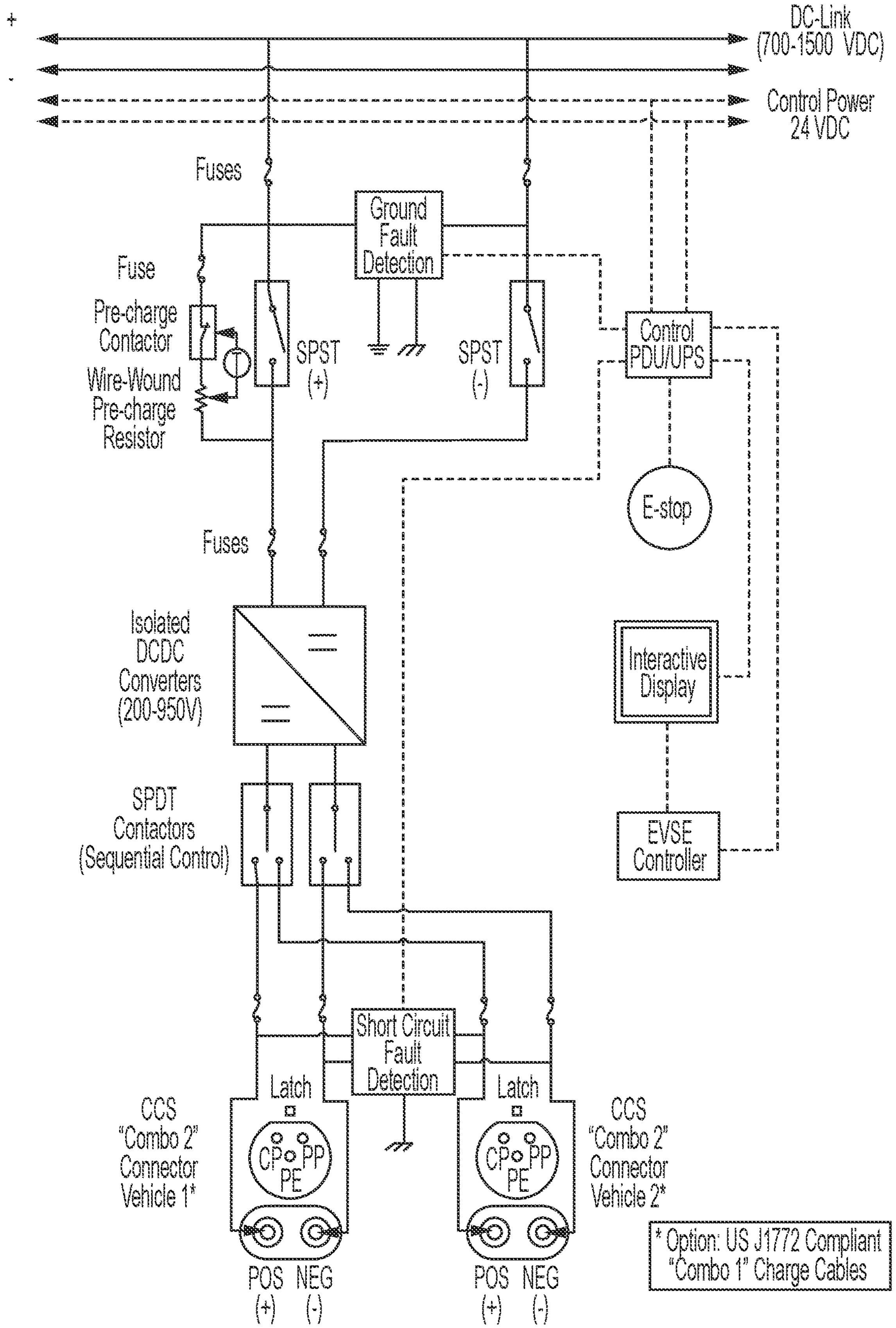
FIG. 5 is a block diagram illustrating a topology having one DC-DC converter, in accordance with some embodiments.
Figure 6:
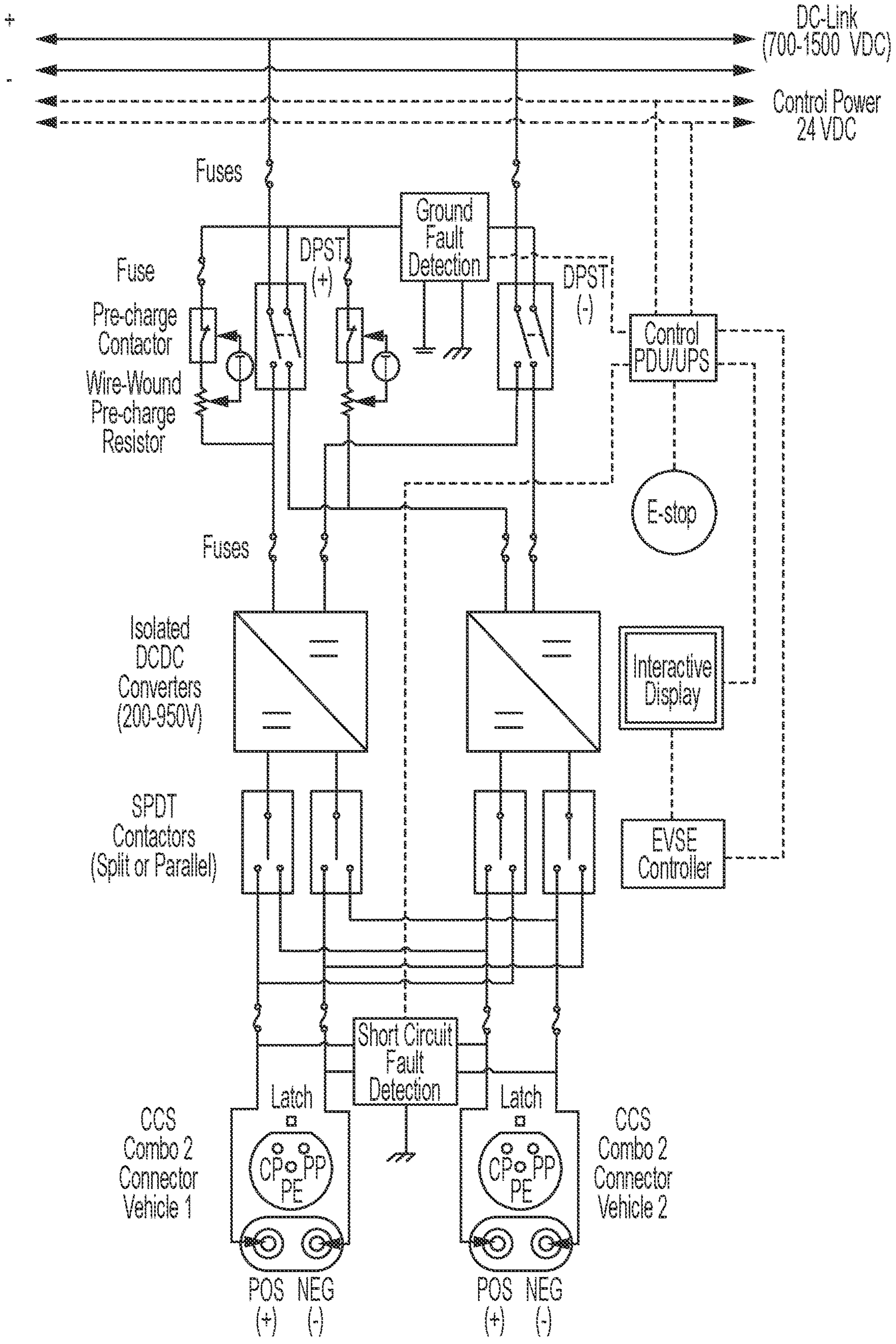
FIG. 6 is a block diagram illustrating a topology having a pair of DC-DC converters, in accordance with some embodiments.

FIG. 5 is block diagram illustrating a topology having one DC-DC converter. FIG. 6 is block diagram illustrating a topology having a pair of DC-DC converters.

Switches (e.g., contactors) are used to manage the operational state topology of a DC-DC converter. Electrical connection control is required both on the input and output sides of a charger. Sequential on/off connection of each charger connected to the DC link may requires a pre-charge to the front-face of the charger's DC-DC converter in addition to isolation of the charger from the DC link for robust fault management and for limiting source current from the inverter supporting the DC link. In some embodiments, the contactors of the vehicle or rear-face side of the DC-DC converter may be arranged in accordance with a normally open (N.O.) or normally closed (N.C.) configuration, and can have one or more switch configurations in a single device—e.g., Simple or Single Position Single Throw (SPST), Single Position Dual Throw (SPDT) or Dual Position Single Throw (DPST).

IV. Charging Protocols

The DC-DC converters may operate in accordance with the demand for current. A vehicle may submit a request for current. Subsequently, a handshake procedure is executed, in which the charger type and the vehicle's voltage range are qualified. Then, a pre-charge phase begins, in which the output voltage matches the vehicle voltage requirement. Then the battery contactors are closed, and the charge phase begins. This process continues until either the charge is complete or interrupted by stopping the charge at the charge station and/or detaching the charge cable from the vehicle.

In some embodiments, high level communications between the electric vehicle and the charger may use the Homeplug Green PHY Powerline Communication (PLC) standard. This standard provides four essential functions: 1) user authentication, 2) authorization for Charging—Successful connection lock, isolation check, and pre-charge, 3) information recording and exchange for network management, data privacy and security, and 4) control of charging current. In some embodiments, the value of the wire wound pre-charge resistor may have to be specified depending on the capabilities of the BESS if it is directly coupled to the DC link and does not have its own pre-charge circuit in its control unit.

Based on power availability from the inverter and other elements supporting the DC link—e.g., a BESS or renewable power system—the available current from each charger can be adjusted based on the fleet management priorities. All this blends fleet telematics into the power dispatch and domain control regimes for charging stations operating within mature renewable energy system architectures. Communication between the charger controller and the system domain controller may be performed via Modbus TCP/IP, for example, via wires or wirelessly. Software at the charger level can be written and executed in multiple ways that can manage different type of interfaces.

V. Charging Modes

The EVCS described herein that can dynamically switch between different charge modes depending upon the needs of the station operator and its customers. Each charger of an EVCS can be switched, for example, between an independent charging mode, a parallel charging mode, a sequential charging mode and a vehicle-to-vehicle changing mode. The chargers of an EVCS may be controlled independently of one another, allowing each charger to be operated in a different mode.

Figure 7A:
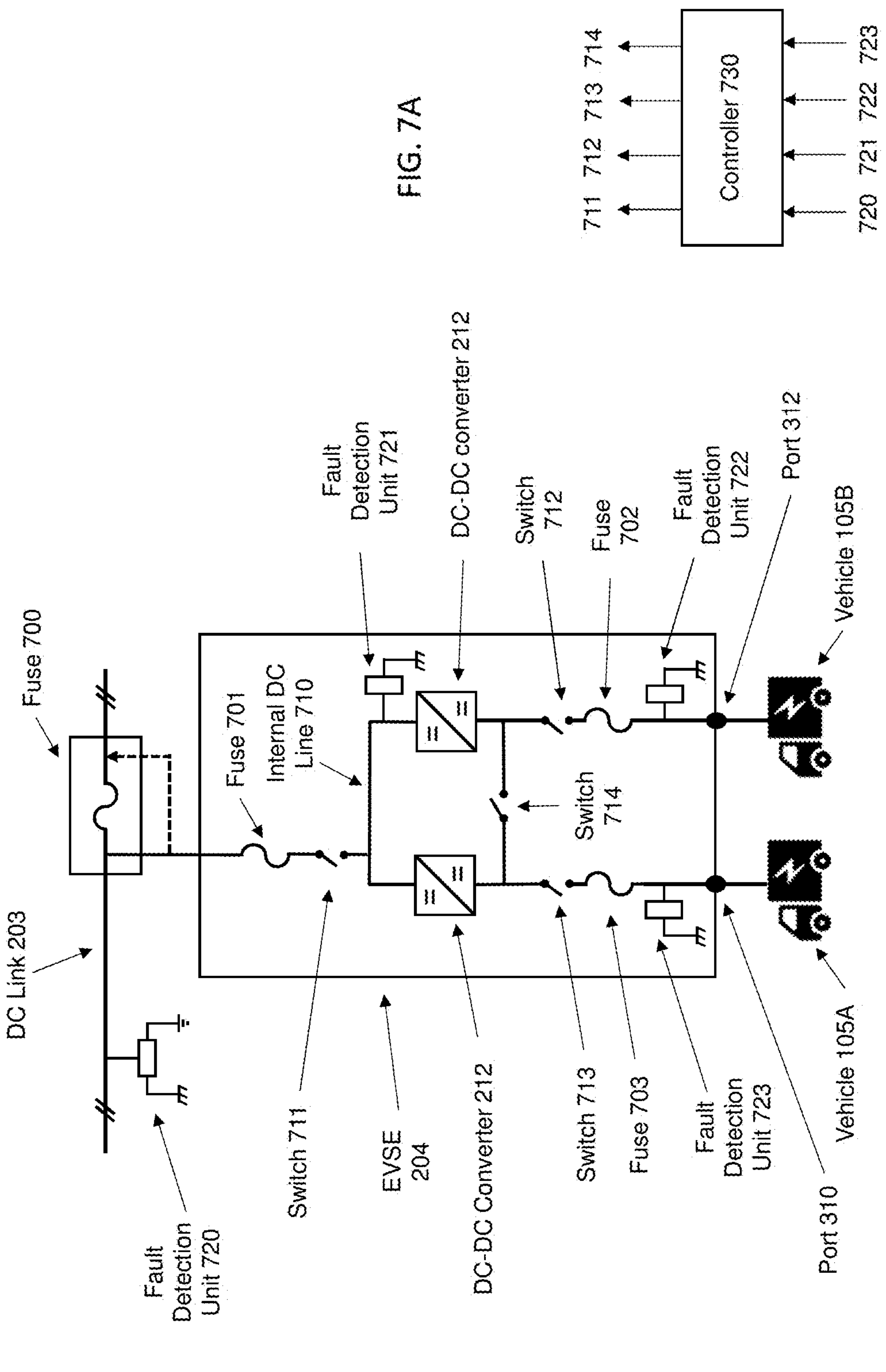
FIG. 7A is a block diagram illustrating an EVSE in additional detail, in accordance with some embodiments.

FIG. 7A is a block diagram of a charger configured to switch between different charging modes, in accordance with some embodiments. In this example, EVSE 204 includes two DC-DC converters 212. A switch 711 couples DC link 203 to a DC line 710 that is internal to the charger. Internal DC line 710 is coupled to the link-side of DC-DC converters 212. A switch 713 couples the vehicle-side of one of DC-DC converters to port 310, to which a vehicle 105A may connect. Similarly, a switch 712 couples the vehicle-side of the other DC-DC converter to port 312, to which a vehicle 105B may connect. A switch 714 cross couples the vehicle-sides of the DC-DC converters together. It should be noted that switches 711, 712, 713 and 714 may be implemented using a single switchable device or a set of switchable devices. When a switch is enabled, electric current may flow across its terminals. Vice versa, when a switch is disabled, electric current may not flow. As used herein, the expression "enabling a switch" may indicate the act of turning on (closing) a switch that was previously turned off, or may indicate the act of keeping a switch turned on that was previously turned on. Similarly, the expression "disabling a switch" may indicate the act of turning off (opening) a switch that was previously turned on, or may indicate the act of keeping a switch turned off that was previously turned off. Controller 730 controls the state of the switches depending upon the desired mode of operation, as described in detail further below.

As further shown in FIG. 7A, fuses may be used to provide overcurrent protection. For example, a fuse 701 is coupled between DC link 203 and internal DC line 710, a fuse 703 is coupled between the vehicle-side of one of the DC-DC converters and port 310 and a fuse 702 is coupled between the vehicle-side of the other DC-DC converter and port 312. Additionally, a fuse 700 is positioned along the DC link 203 to protect the DC link against overcurrent. Fuse 700 may be positioned inside a junction box connected in series to the DC link. As discussed further below, the presence of fuse 700 may be particularly useful in arrangements in which DC link 203 includes various segments made of cables of different characteristics (e.g., sizes). In these arrangements, fuse 700 may connect a cable of larger size with a cable of smaller size, thereby protecting the cable of smaller size against large currents that may flow in the cable of larger size. Having cables of smaller size enables an overall cost reduction if the smaller cables are positioned in parts of the DC link where large currents are not expected.

Fault detection units may be used to monitor the usability of a particular DC component. For example, fault detection unit 720 may monitor the state of DC link 203, fault detection unit 721 may monitor the state of Internal DC line 710, fault detection unit 722 may monitor the state of the line connected to port 312 and fault detection unit 723 may monitor the state of the line connected to port 310. Signals generated by the fault detection units may be provided as inputs to controller 730, thus allowing controller 730 to reroute electric current if faulty components are detected.

Figure 7B:
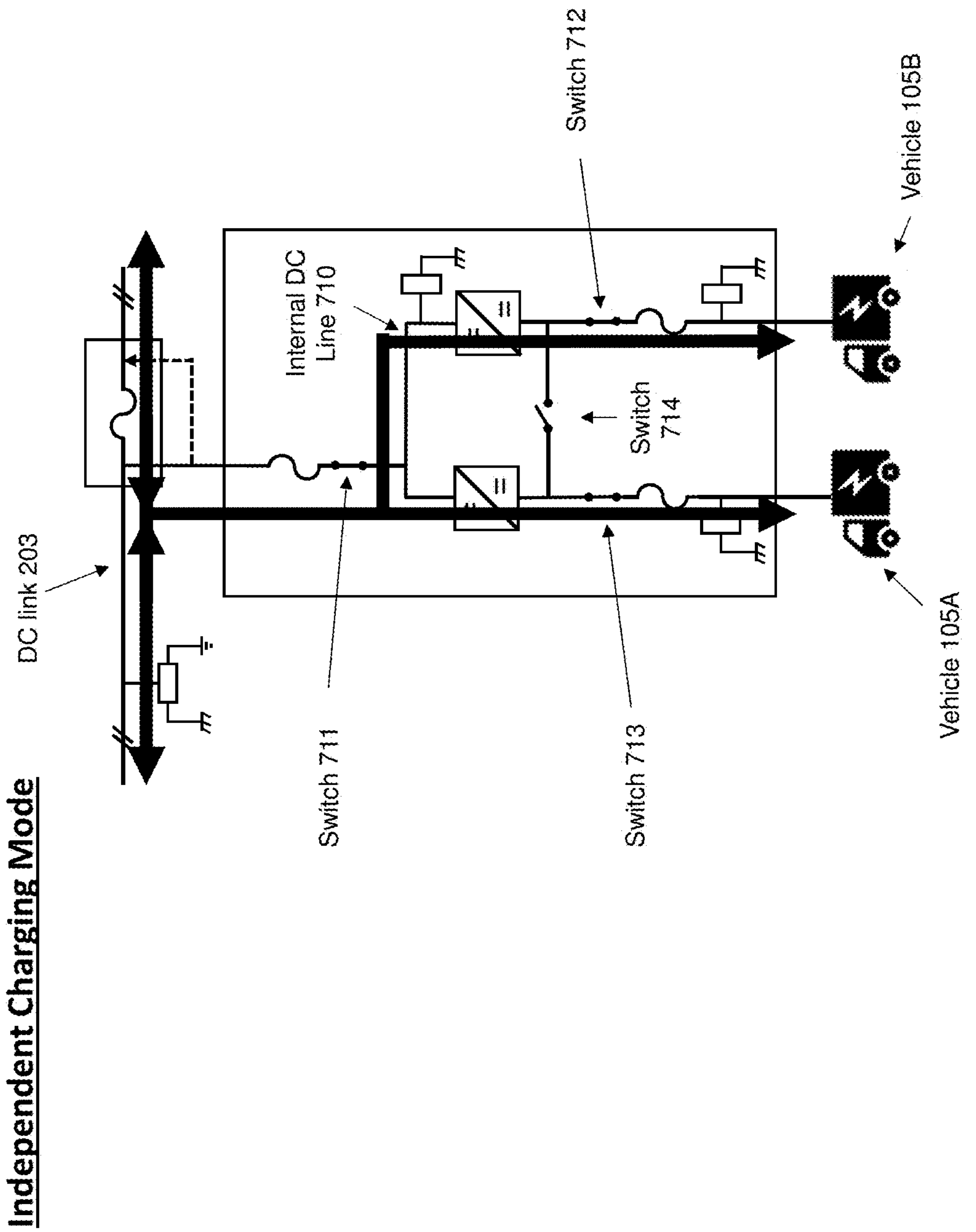
FIG. 7B is a block diagram illustrating an EVSE in an independent charging mode, in accordance with some embodiments.

FIG. 7B illustrates the independent charging mode. Here, each DC-DC converter is used to charge the battery of a respective vehicle. To enable this mode, controller 730 enables switches 711, 712 and 713 and disables switch 714. This mode may be used in situations in which it is desirable to charge the batteries of multiple vehicles in parallel. Power to charge vehicles 105A and 105B may be obtained from utility POI 100, from BESS 210, from renewable sources 214, from a vehicle battery connected to DC link 203 using another EVSE 204, or from any combination thereof.

Figure 7C:
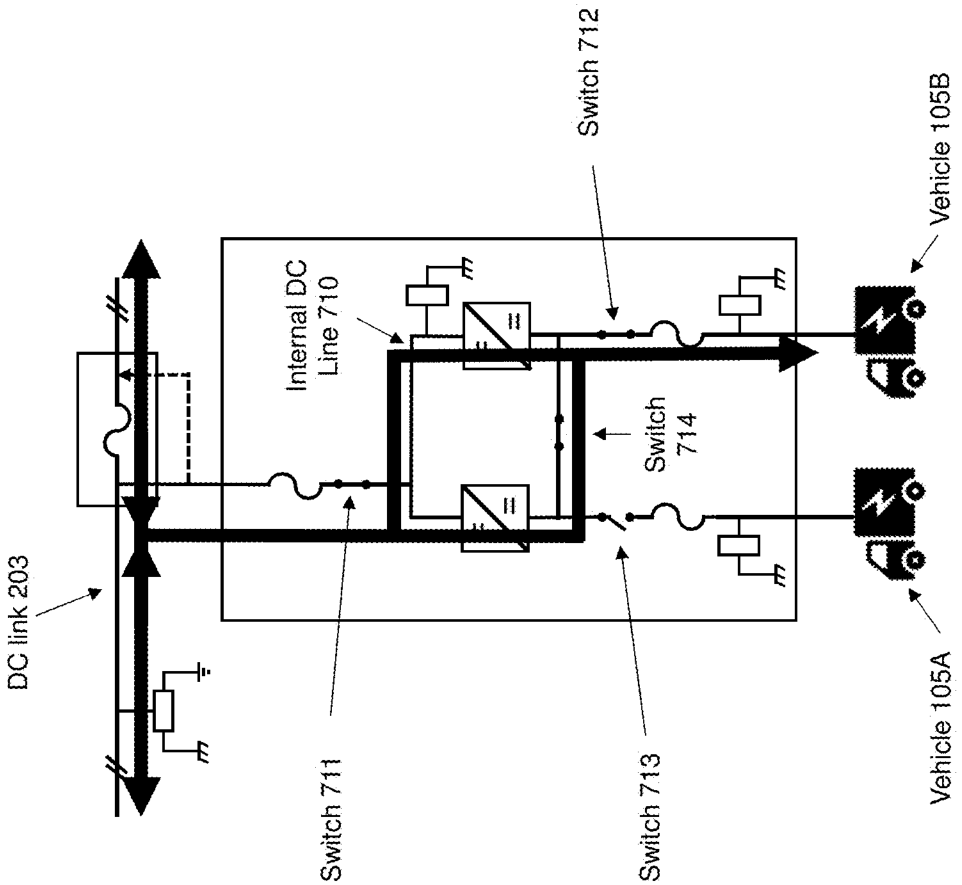
FIG. 7C is a block diagram illustrating an EVSE in a first parallel charging mode, in accordance with some embodiments.
Figure 7D:
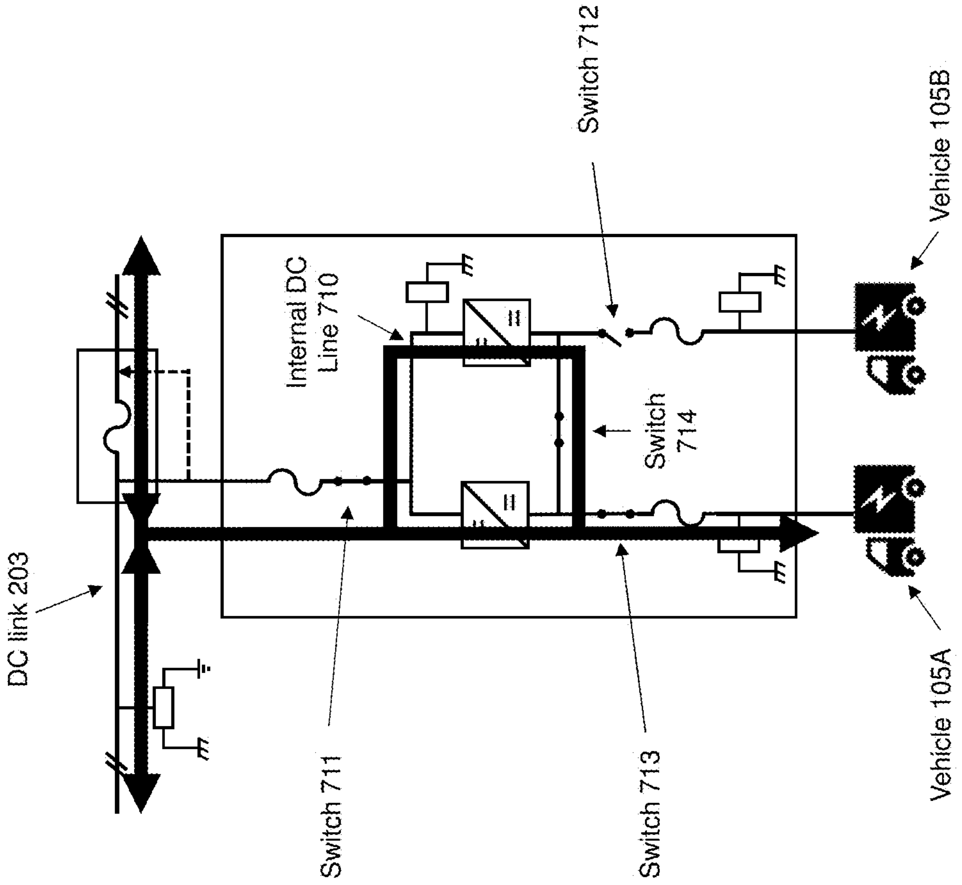
FIG. 7D is a block diagram illustrating an EVSE in a second parallel charging mode, in accordance with some embodiments.

FIGS. 7C-7D illustrate the parallel charging mode. In FIG. 7C, both DC-DC converters are used to charge the battery of vehicle 105B. To enable this mode, controller 730 enables switches 711, 712 and 714 and disables switch 713. In FIG. 7D, both DC-DC converters are used to charge the battery of vehicle 105A. To enable this mode, controller 730 enables switches 711, 713 and 714 and disables switch 712. The parallel charging mode enables, for example, the ability to deliver up to 160 kW to a vehicle using DC-DC converters configured to supply 80 kW each. As in FIG. 7B, power to charge vehicle 105A (or 105B) may be obtained from utility POI 100, from BESS 210, from renewable sources 214, from a vehicle battery connected to DC link 203 using another EVSE 204, or from any combination thereof.

Figure 7E:
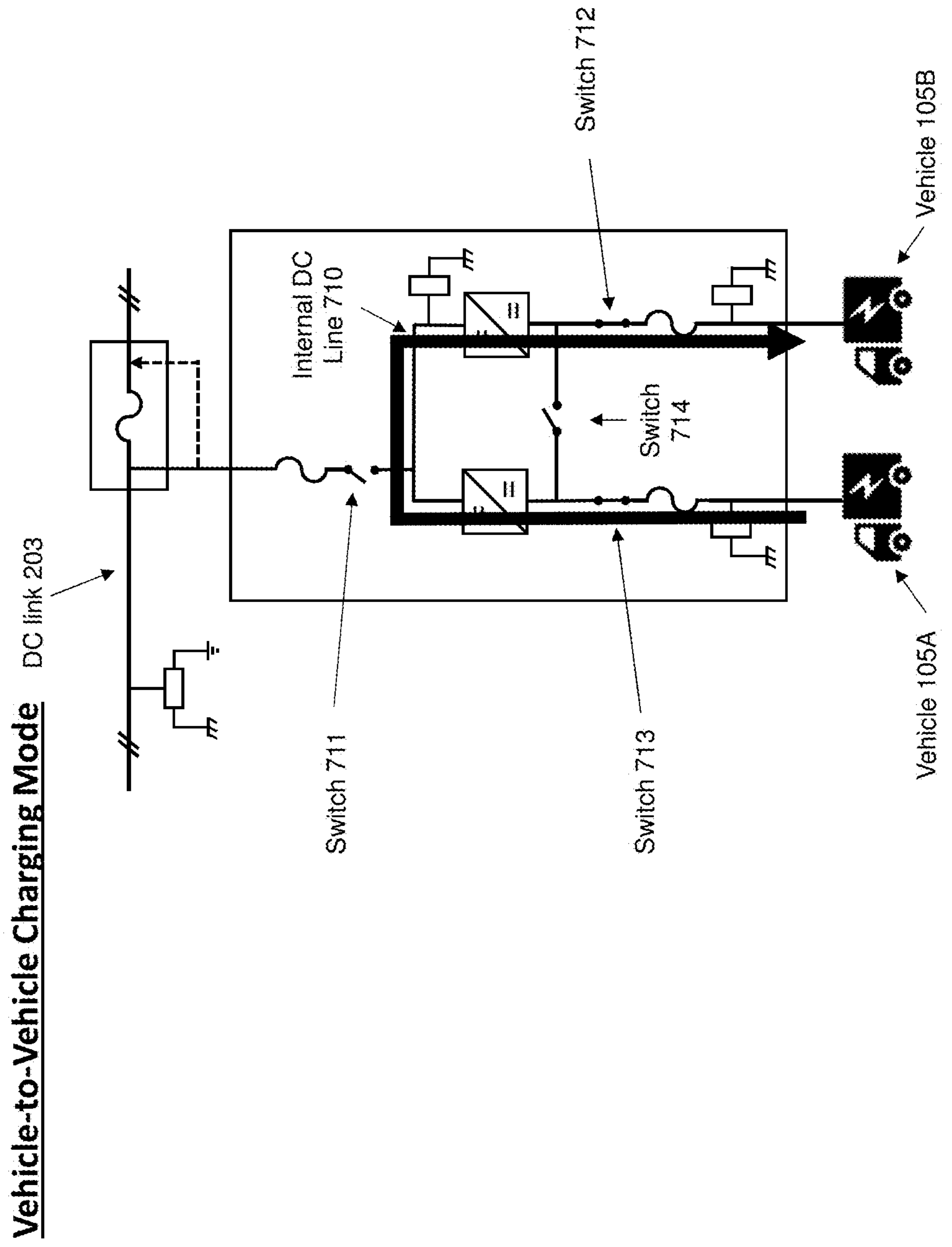
FIG. 7E is a block diagram illustrating an EVSE in a vehicle-to-vehicle charging mode, in accordance with some embodiments.

FIG. 7E illustrates the vehicle-to-vehicle charging mode. Here, the DC-DC converters are used to charge the battery of a vehicle using energy stored in the battery of another vehicle. To enable this mode, controller 730 enables switches 712 and 713, and disables switches 714 and 711. This mode may be used in situations in which a vehicle with stored energy in excess can use some of that energy to charge another vehicle battery. Disabling switch 711 allows the energy to flow through internal DC line 710 (as opposed to DC link 203). Allowing energy to flow through internal DC line 710 reduces energy consumption relative to charging a vehicle battery with another vehicle battery using DC link 203 because it does not require control of inverter 206.

Figure 7F:
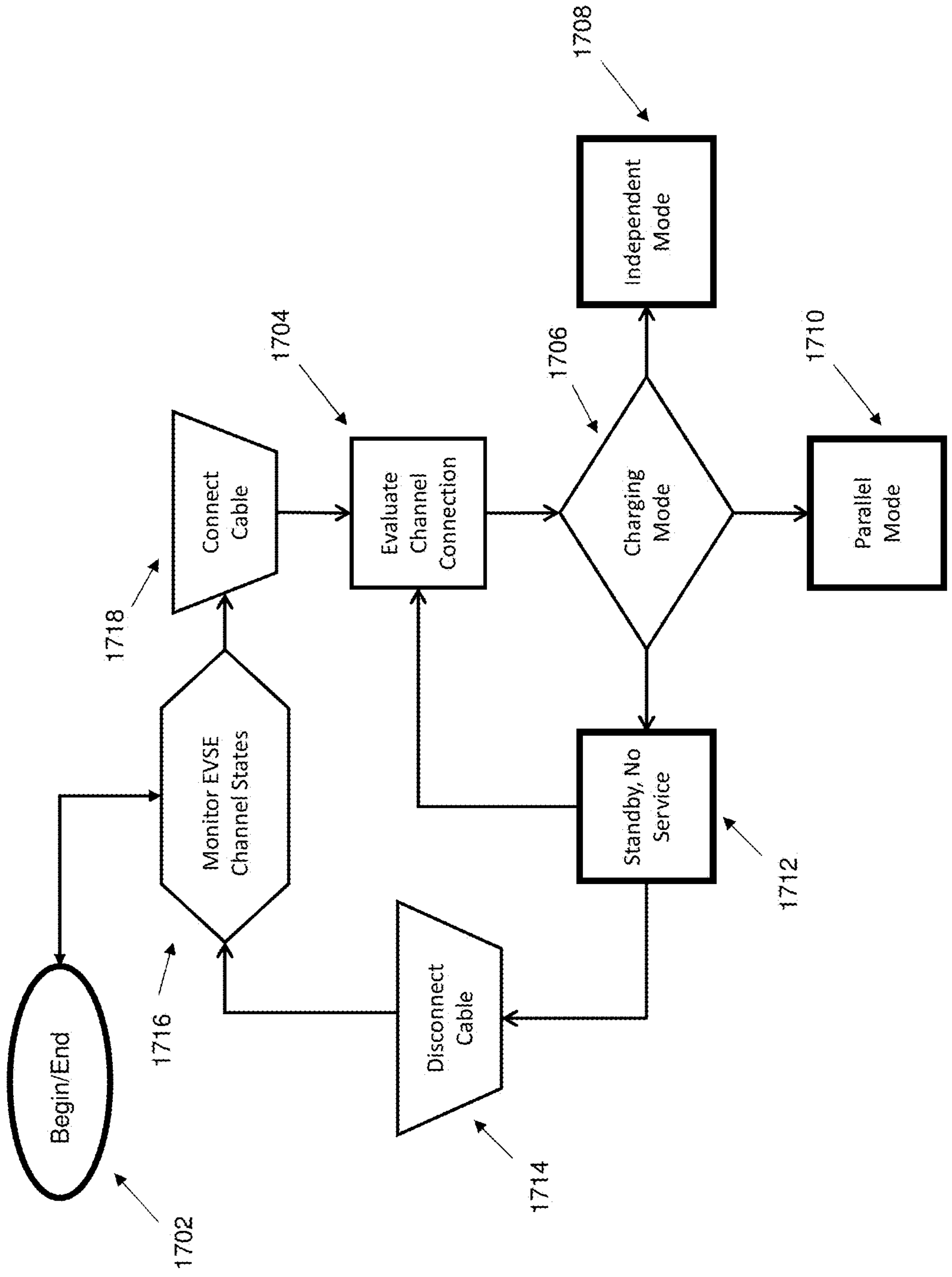
FIG. 7F is a flowchart illustrating a charging initialization process, in accordance with some embodiments.

FIG. 7F is a flowchart illustrating a charging initialization process, in accordance with some embodiments. Process 1700 begins at step 1702. At step 1716, controller 730 monitors the charger to determine whether a cable has been connected. Further, controller 730 may monitor the power available in the charging station. Step 1718 indicates the event in which a cable is connected, thus connecting a vehicle to the charger. In that event, process 1700 moves to step 1704. At step 1704, controller 730 evaluates the presence of vehicles connected to a charger (EVSE 204). In addition, controller 730 may wake-up the charger from a sleep (low-power) mode. At step 1706, controller 730 determines in which charging mode to place the charger. In some embodiments, determining in which charging mode to place the charger may involve determining how many vehicles are connected to the charger and/or determining the power requirements of the batteri(es) of the vehicles connected to the charger. For example, in some embodiments, if the controller determines that a single vehicle is connected to the charger and the power requirement of the vehicle's battery exceeds the power output by an individual DC-DC converter, the controller may place the charger in the parallel mode. Alternatively, if the controller determines that multiple vehicles are connected to the charger and the power requirements of the batteries of the vehicle are below the power output by an individual DC-DC converter, the charger may place the charger in the independent mode. Alternatively, if the controller determines that multiple vehicles are connected to the charger and the power requirements of at least one of the batteries exceeds the power output of an individual DC-DC converter, the charger may place the charger in the independent mode or in the parallel mode based on other parameters, (e.g., the capability of the grid, the overall energy currently available in the station, the efficiency of the DC-DC converters, the level of pre-existing charge stored in the batteries of the vehicles, the grid power quality, the availability of energy produced using renewable sources, the isolation of the DC-DC converters and that of the DC link, the availability of channels across the charging station, the existence of protocols to prioritize particular channels over other channels or particular types of vehicles over other types of vehicles or particular customers (e.g., preferred customers) over other types of customers, etc.).

If the controller decides to place the charger in the independent mode, process 1700 moves to step 1708. If the controller decides to place the charger in the parallel mode, process 1700 moves to step 1710. Alternatively, if the controller determines that no service is required, process 1700 may move to step 1712, placing the charger in a standby mode. For example, controller 730 may determine that the batteries of the vehicles connected to the charger are fully charged, or that a vehicle has not yet initiated a power request. Process 1700 may loop back to step 1704 to determine whether to begin charging and in which mode. Step 1714 indicates the event in which a cable is disconnected, thus disconnecting a vehicle from the charger. Process 1700 may move back to step 1716, in which controller 730 monitors the charger to determine whether a cable has been re-connected. If a cable is re-connected, process 1700 proceeds to step 1704, otherwise it ends.

Figure 7G:
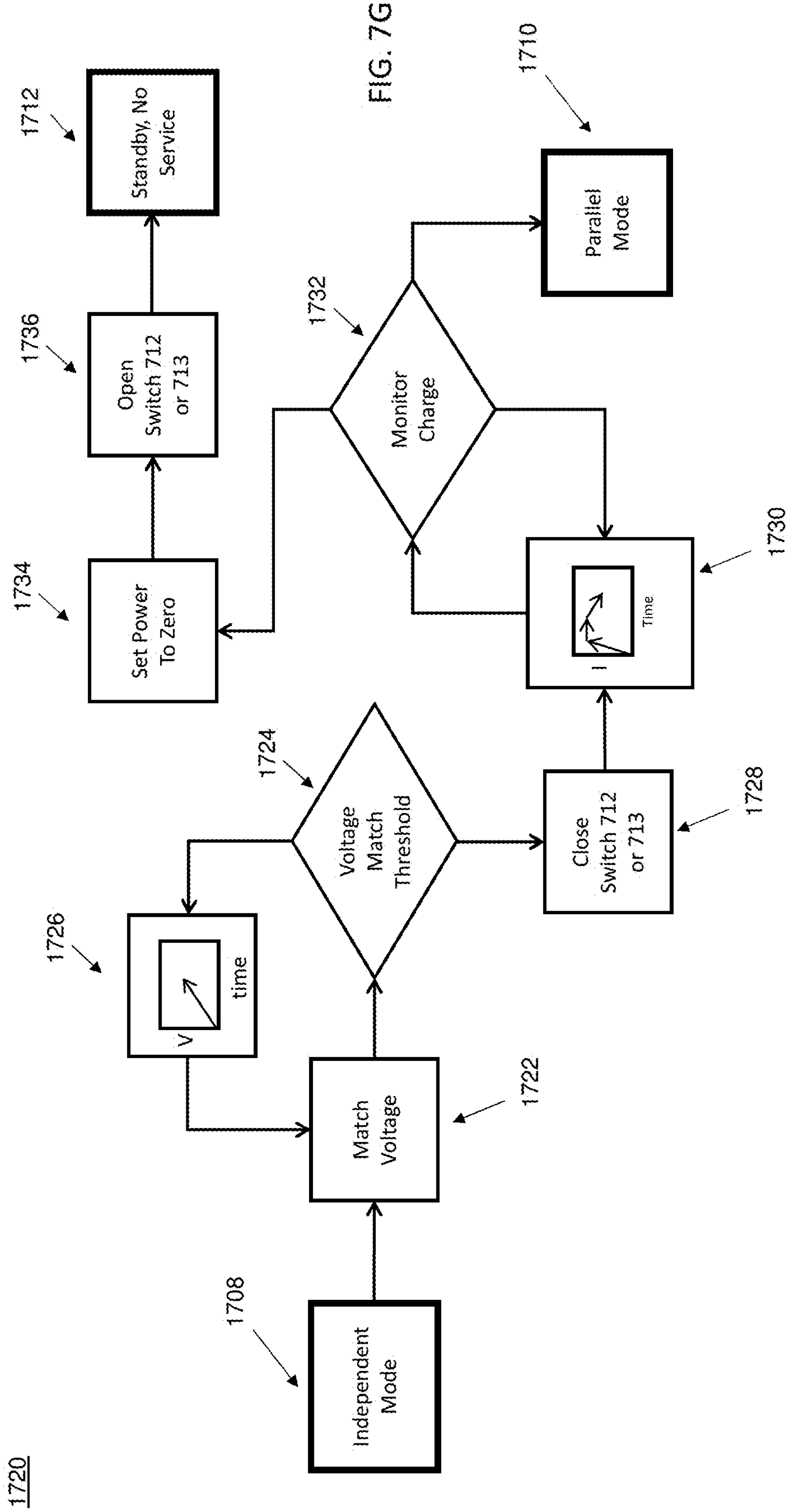
FIG. 7G is a flowchart illustrating a charging process based on an independent mode, in accordance with some embodiments.

FIG. 7G is a flowchart illustrating a charging process based on the independent mode, in accordance with some embodiments. Process 1720 begins at step 1708. At step 1722, controller 730 begins a procedure to match the output voltage of a DC-DC converter to the voltage required by the vehicle's battery. At step 1724, controller 730 determines whether the voltage has reached a threshold value. The threshold value may be set depending on the voltage requirement of the battery. For example, the threshold value may be set to 60%, 70%, 80% or 90% of the required voltage. If it is determined that the threshold has not been reached, controller 730 continues to raise the output voltage at step 1726. Otherwise, if it is determined that the threshold has been reached, process 1720 moves to step 1728, in which the switch that connects the DC-DC converter to the vehicle (e.g., switch 712 or 713) is closed. At this stage, controller 730 further ensures that switch 711 is closed and that switch 714 is open. At step 1730, charging of the battery is initiated using a single DC-DC converter.

At step 1732, controller 730 monitors the level of charge of the battery. For example, controller 730 may monitor the amount of current being drawn by the battery. If it is determined that the battery continues to draw current from the charger, process 1720 loops back to step 1730 to continue the charge. On the other hand, if it is determined that the battery is no longer drawing current from the charger, process 1720 moves to step 1734, in which the power being output on the channel is set to zero. At step 1736, the switch that was closed at step 1728 (e.g., switch 712 or 713) is opened. Optionally, switch 711 may be opened at step 1736, thus disconnecting EVSE 204 from DC link 203. Process 1720 may then move to the standby mode (step 1712).

In some embodiments, process 1720 may move from step 1732 to step 1710, thereby switching from the independent charging mode to the parallel charging mode. This may be triggered by one of several possible events. In one example, controller 730 may detect that a second vehicle that was previously connected to the same charger has now been disconnected, thus freeing additional power. In that case, if the battery of the first vehicle has not been fully charged yet, controller 730 may switch to the parallel mode, thereby reserving another DC-DC converter to the first vehicle. In another example, controller 730 may determine that the battery of the other vehicle connected to the charger is now sufficiently charged (e.g., above a threshold value), such that the DC-DC converter previously used by the other vehicle can now be used by the first vehicle. In yet another example, controller 730 may determine at step 1732 that the power provided by a single DC-DC converter is not sufficient to charge the battery, and may decide to reserve another DC-DC converter to the vehicle (whether or not a second vehicle is connected to charger).

Figure 7H:
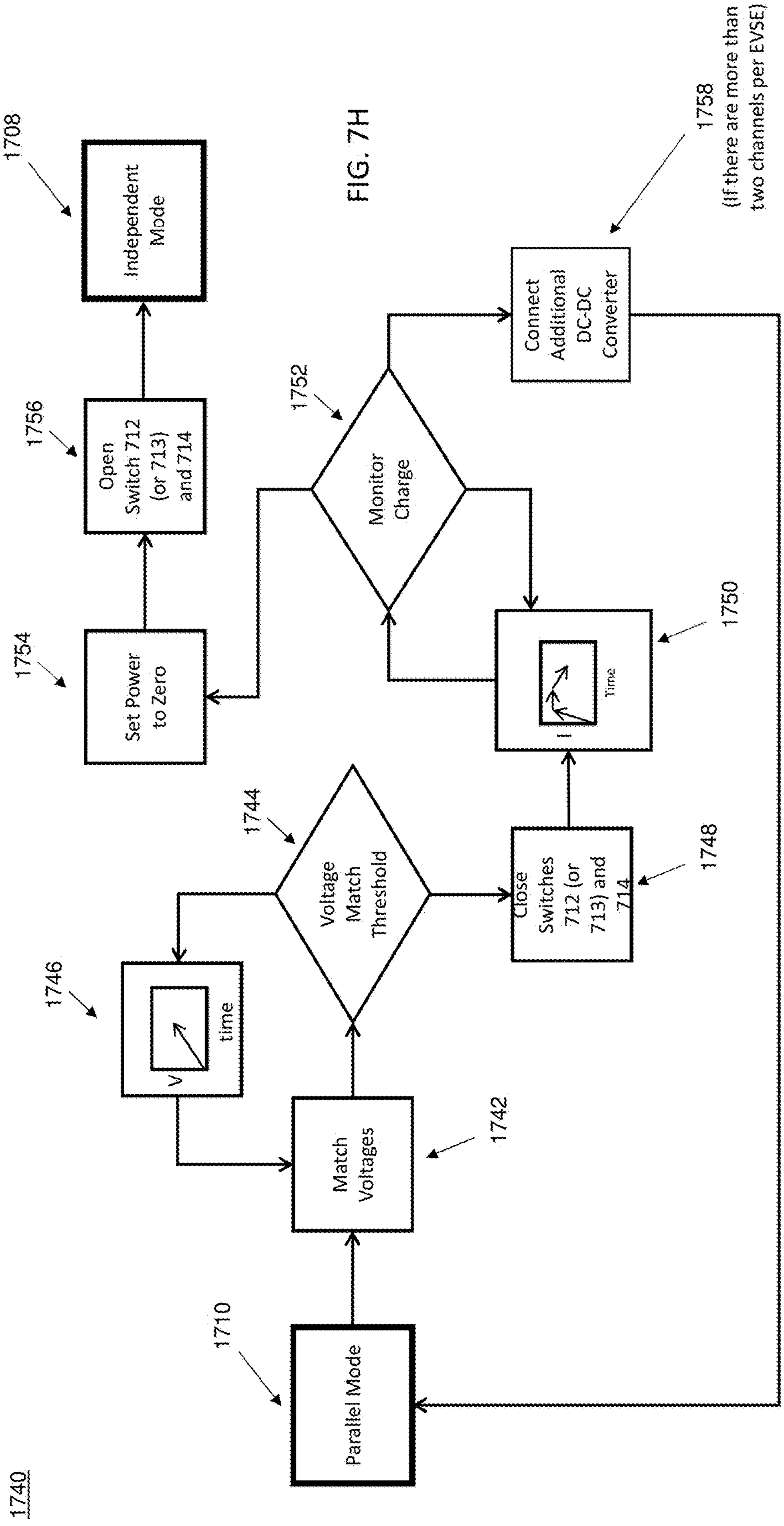
FIG. 7H is a flowchart illustrating a charging process based on a parallel mode, in accordance with some embodiments.

FIG. 7H is a flowchart illustrating a charging process based on the parallel mode, in accordance with some embodiments. Process 1740 begins at step 1710. At step 1742, controller 730 begins a procedure to match the output voltages of multiple DC-DC converters to the voltage required by the vehicle's battery. At step 1744, controller 730 determines whether the voltages have reached a threshold value (the threshold value may be set as discussed in conjunction with FIG. 7G). If it is determined that the threshold has not been reached, controller 730 continues to raise the output voltage at step 1746. Otherwise, if it is determined that the threshold has been reached, process 1740 moves to step 1748, in which switches 711, 712 and 714 are closed while switch 713 is opened. This allows both DC-DC converters to be utilized in charging vehicle 105B (as shown in FIG. 7C). Alternatively, switches 711, 713 and 714 may be closed (while opening switch 712), allowing both DC-DC converters to be utilized in charging vehicle 105A (as shown in FIG. 7D). At step 1750, charging of the battery is initiated using multiple DC-DC converters.

At step 1752, controller 730 monitors the level of charge of the battery. For example, controller 730 may monitor the amount of current being drawn by the battery. If it is determined that the battery continues to draw current from the charger, process 1740 loops back to step 1750 to continue the charge. On the other hand, if it is determined that the battery is no longer drawing current from the charger, process 1740 moves to step 1754, in which the power being output on the channel is set to zero. At step 1756, switch 714 may be opened, thus reverting the charger back to the independent mode. Whether to revert back to the independent mode may be triggered by one of several possible events. In one example, controller 730 may detect that a second vehicle is now connected to the same charger, and that the second vehicle has initiated a power request. In another example, controller 730 may determine that there is not sufficient power in the grid to support the parallel mode. In yet another example, controller 730 may determine that the battery of the first vehicle is almost fully charged, such that one of the DC-DC converters may be released for use by other vehicles.

Alternatively, controller 730 moves to step 1758, which involves reserving another DC-DC converter to the same vehicle. This step may be used in conjunction with chargers having at least three DC-DC converters where the power of two DC-DC converters is below the power requirements of a particularly large battery. Process 1740 may then move back to step 1710, where the parallel mode is re-initiated using the additional DC-DC converter.

VI. Vehicle-to-Grid (V2G)

Figure 8A:
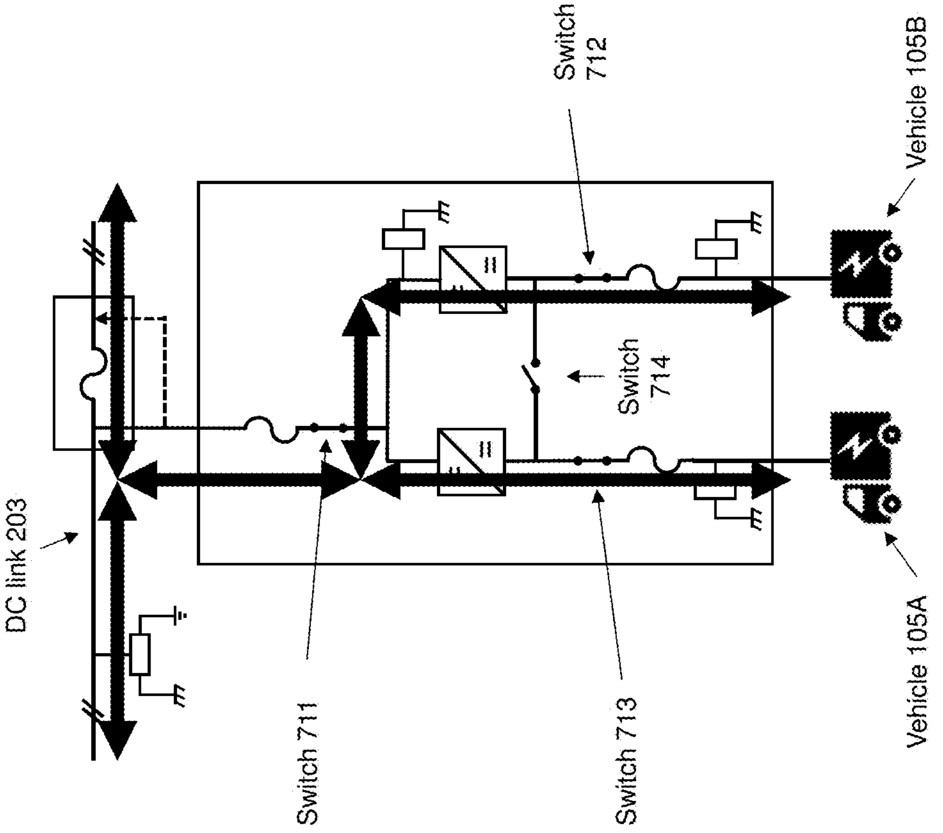
FIG. 8A is a block diagram illustrating an EVSE in an independent charging/discharging mode, in accordance with some embodiments.

The bi-directional nature of the DC-DC converters described herein enables vehicle-to-grid (V2G) applications, in which pre-charged vehicle batteries supply electric energy back to the grid. This can be useful in several circumstances to improve resilience, frequency regulation, and Volt-Var reactive power management. Further, having multiple DC-DC converters per charger allows one vehicle to receive power from the grid and another vehicle to provide power back to the grid, for example. This use case is illustrated in FIG. 8A, showing an independent charging/discharging mode. The bi-directional arrows indicate that power may flow in either direction. In one example, one DC-DC converter charges vehicle 105A with power delivered through DC link 203, while the other DC-DC converter conveys power provided by vehicle 105B back to the grid via DC link 203. Alternatively, both vehicles 105A and 105B may provide power back to the grid.

Figure 8B:
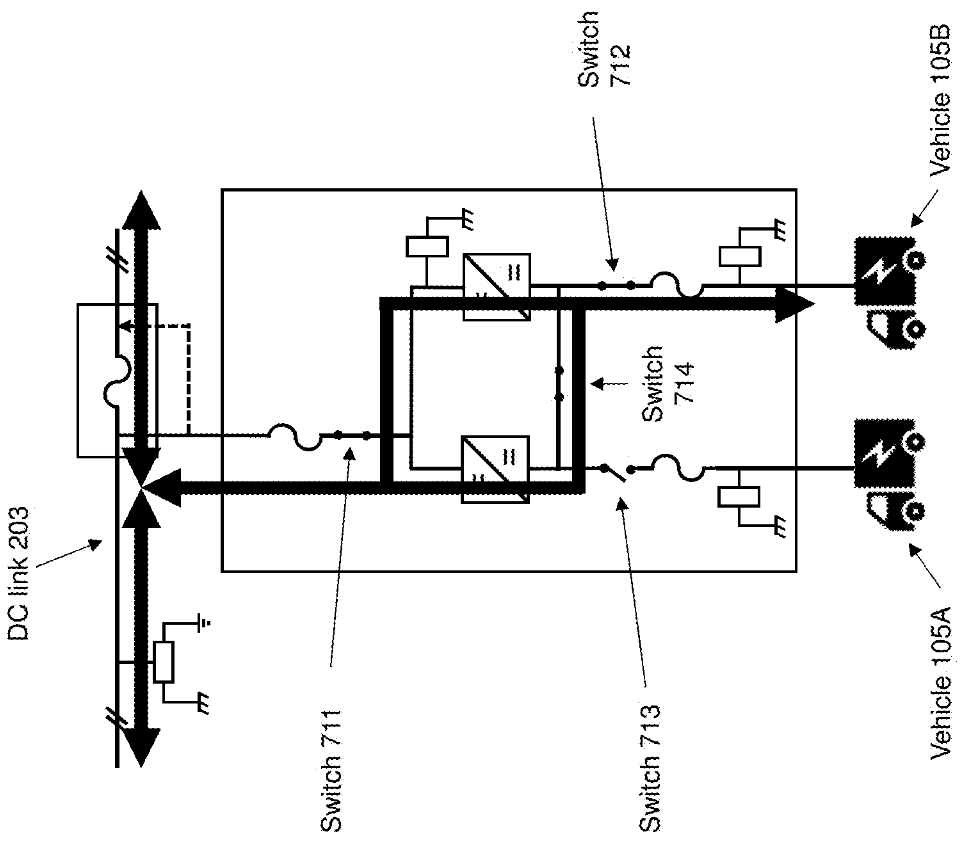
FIG. 8B is a block diagram illustrating an EVSE in a first parallel discharging mode, in accordance with some embodiments.
Figure 8C:
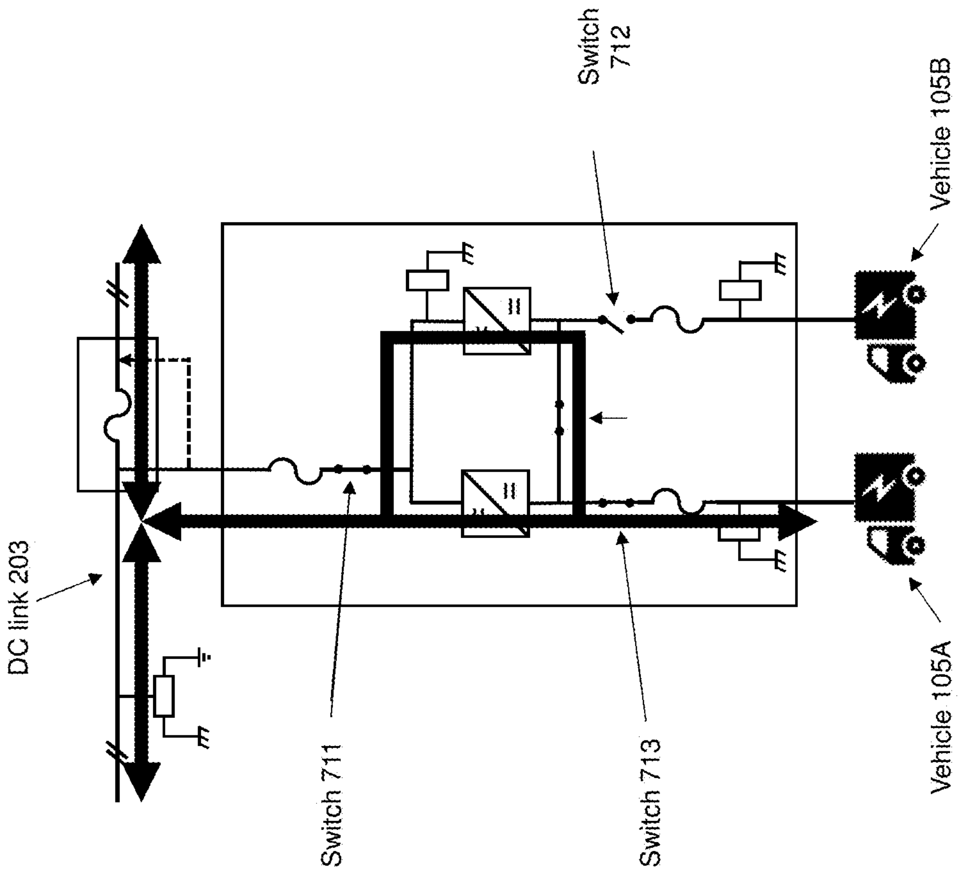
FIG. 8C is a block diagram illustrating an EVSE in a second parallel discharging mode, in accordance with some embodiments.

FIGS. 8B-8C illustrate parallel discharging modes, in which a vehicle provides power back to the grid using multiple DC-DC converters. This mode may be useful where the power that a vehicle can provide exceeds the power that a single DC-DC converter can handle. For example, a charger including a pair of DC-DC converters configured to supply 80 kW each can deliver up to 160 kW from the vehicle back to the grid. Again, the bi-directional arrows indicate that power may flow in either direction. In FIG. 8B, power is provided by vehicle 105B, while in FIG. 8C, power is provided by vehicle 105A.

VII. Power Delivery

The inventors have appreciated that cables rated for 150 A may limit the amount of delivered power to 400V class vehicles, whether using a charger with a single DC-DC converter (e.g., with 80 kW delivered) or dual DC-DC converter (e.g., with 160 kW delivered). The inventors have further appreciated that using cables rated for 200 A, a charger with a single DC-DC converter may be limited to 400 V class vehicles and a charger with a dual DC-DC converter may be limited to 800 V class vehicles. In some embodiments, cooled cables benefit power delivery for 400V class vehicles, but not for 800 V.

Accordingly, in some embodiments, 150 A cables are used in connection with single DC-DC converter configurations serving 800 V class vehicles, and 200 A cables are used either in connection with configurations serving 400 V class vehicles and/or configurations using dual DC-DC converters with sequential-charging capabilities.

The following table illustrates the specification of a number of product offerings, in accordance with some embodiments.

| Model | Input Type | Station Power (kW)* | # Charging Cables | Power Per Cable (kW)* | Charging Mode |
|---|---|---|---|---|---|
| PosE-DC-A1 | DC up to 1500 V, 120 A | 80 | 1 | 80 | Independent |
| PosE-DC-A2 | DC up to 1500 V, 120 A | 80 | 2 | 80 | Independent + Sequential (1) |
| PosE-DC-A3 | DC up to 1500 V, 360 A | 240 | 3 | 80 | Independent |
| PosE-DC-A4 | DC up to 1500 V, 480 A | 320 | 4 | 80 | Independent |
| PosE-DC-B1 | DC up to 1500 V, 240 A | 160 | 1 | 160 | Independent |
| PosE-DC-B2 | DC up to 1500 V, 240 A | 160 | 2 | 80 or 160 | Independent + Split (2) + Sequential (3) |
| PosE-DC-B2B | DC up to 1500 V, 480 A | 320 | 2 | 160 or 320 | Independent + Split (2B) + Sequential (3) |
| PosE-DC-C1 | DC up to 1500 V, 360 A | 240 | 1 | 240 | Independent |
| PosE-DC-D1 | DC up to 1500 V, 480 A | 320 | 1 | 320 | Independent |
| PosE-AC-30-1 | 480 VAC, 3P, 40 A | 30 | 1 | 30 | Independent |
| PosE-AC-30-2 | 480 VAC, 3P, 80 A | 60 | 2 | 30 | Independent (4) |

-continued

| Model | Input Type | Station Power (kW)* | # Charging Cables | Power Per Cable (kW)* | Charging Mode |
|---|---|---|---|---|---|
| PosE-AC-30-2 | 480 VAC, 3P, 120 A | 90 | 3 | 30 | Independent (4) |
| PosE-AC-30-2 | 480 VAC, 3P, 160 A | 120 | 4 | 30 | Independent (4) |

Notes:
(1) Charging is Independent from one charger to another but sequential between vehicles connected to same charger.
(2) Charging station has two independent fully dynamic DC chargers, each with 80 kW.
(2B) Charging station has two independent fully dynamic DC chargers, each with 160 kW.
(3) Charging is Independent from one charger to another but in addition to operating in split mode can also apply full power sequentially between vehicles connected to same charger.
(4) Charging station has two independent fully dynamic DC chargers, each with 30 kW.
All part numbers shown are for uni-directional DCDC. Add a '-V2G' to every part number for bi-directional DCDC.
Power per station and power per cable ratings change based on specific DCDC model and other components used.

VIII. Multi-Segment DC Links

In some embodiments, the DC links described herein may be formed using multiple segments. Each segment may include a cable having a certain rating. This allows deployment of costly, high rating cables only in those parts of a DC link that are expected to support high current, whereas parts of a DC link that are not expected to support high current may be implemented using less costly, low rating cables. For example, upstream segments of a DC link may be implemented using cables of higher rating relative to the cables used for the downstream segments (the upstream segment being the ones closer to the inverter).

Figure 9A:
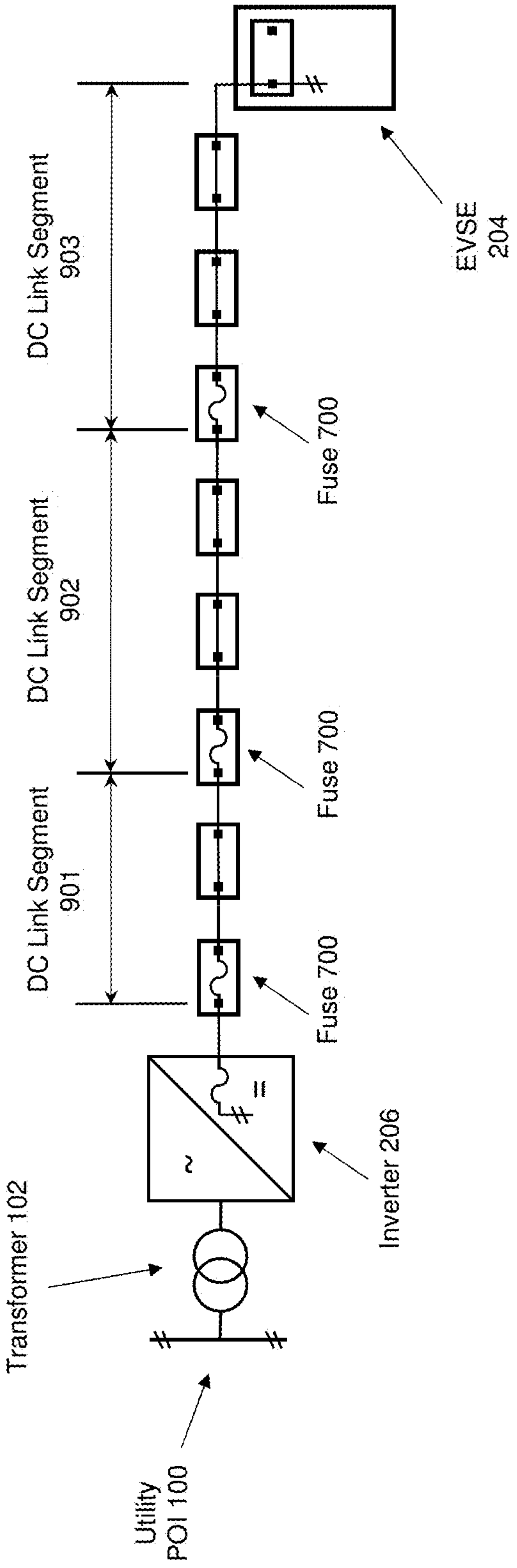
FIG. 9A is a block diagram illustrating a DC link having multiple segments, in accordance with some embodiments.

This approach can substantially reduce the overall cost resulting from the deployment of cables across a charging station. Different levels of current rating may be achieved for example by using cables of different dimensions—larger cables can support higher current than smaller cables. FIG. 9A illustrates an architecture with a multi-segment DC link, in accordance with some embodiments. In this example, DC link 203 includes DC link segments 901, 902 and 903, which may be implemented as cables having different dimensions. Although only one EVSE 204 is shown at the end of the DC link, multiple EVSEs 204 may branch out at various locations along the DC link, as described in connection with the previous figures. In one example, DC link segment 901 (the most upstream link) should be rated to support enough current to supply all EVSEs connected to the DC link. The downstream DC link segments may have progressively lower rating, as the current requirement diminishes farther away from the inverter.

Fuses 700 may be used in some embodiments to protect cables having lower ratings against inadvertent current surges which may otherwise damage the cables. In FIG. 9A, fuses 700 are positioned at the interface between adjacent DC link segments. For example, a terminal of a fuse may be connected to a cable having higher rating and the other terminal of the fuse may be connected to another cable having lower rating. In this way, the cable having lower rating is protected against current surges that may occur in the cable having higher rating.

Figure 9B:
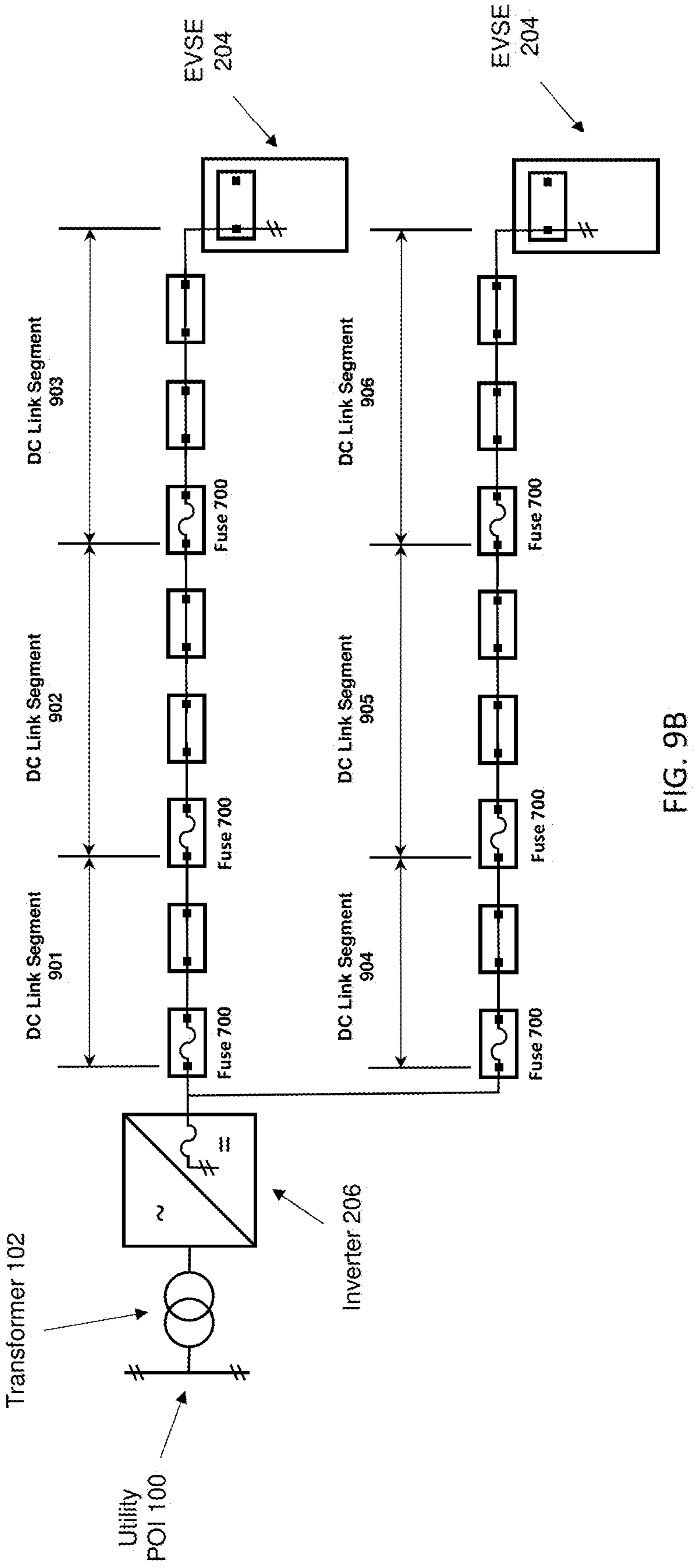
FIG. 9B is a block diagram illustrating a DC link having multiple branches, each branch having multiple segments, in accordance with some embodiments.

It should be noted that DC links of the types described herein are not limited to being arranged as a single branch as in the examples of FIG. 2 and FIG. 9A, but can be arranged to form nodes, loops, stubs, branches, etc. In the architecture of FIG. 9B, for example, the DC link presents a node from which two distinct branches extend. The upper branch includes DC link segments 901, 902 and 903, and the lower branch includes DC link segments 904, 905 and 906. As described in connection with FIG. 9A, the DC link segments may represent cables having different ratings, and fuses may be positioned at the interface between adjacent segments. Multiple EVSEs may branch out at various locations along the DC links.

Figure 10:
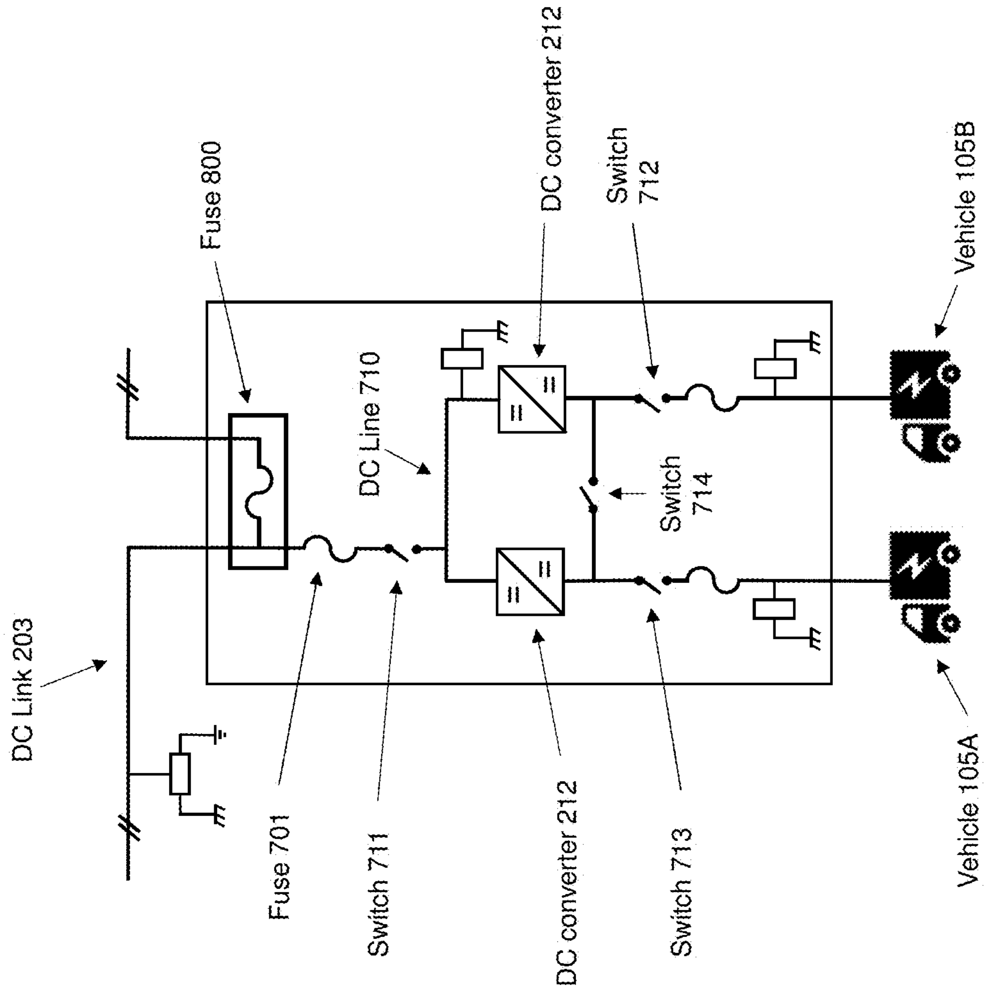
FIG. 10 is a block diagram illustrating a charger having a fuse inserted along a DC link, in accordance with some embodiments.

Fuse 700 has been illustrated as being inserted along the DC link 203 outside EVSE 204. Additionally, or alternatively, fuses for preventing damage to DC link segments having lower rating may be inserted inside an EVSE 204. FIG. 10 illustrates an arrangement in which a fuse 700 is replaced with a fuse 800, which is also inserted along the DC link 203, but inside EVSE 204. In some embodiments, a charging station may use a mix of fuses 700 and fuses 800. Having fuses that can be inserted either inside or outside a charger may help reduce the cost of the DC link in cases where a charger may be installed a great distance from the inverter. Chargers placed in closer proximity to the inverter may be equipped with fuses 800, while fuses 700 may be used for chargers positioned farther away from the inverter. Installing a remote fuse outside the chargers reduces installation cost for those chargers.

IX. Pre-Charging

Figure 11:
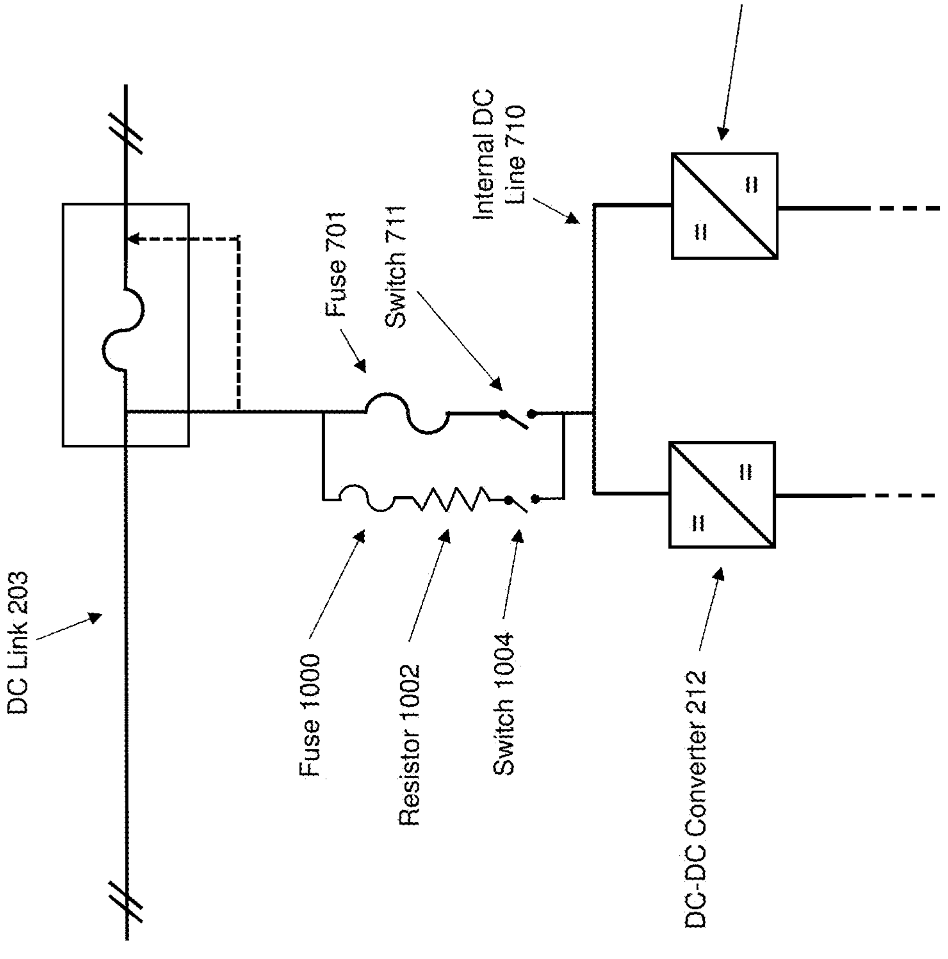
FIG. 11 is a block diagram illustrating a charger having pre-charge path, in accordance with some embodiments.

The inventors have further developed pre-charging schemes configured to increase the voltage of an internal DC line 710 to the desired value using relatively low current. Using relatively low current to increase the voltage of an internal DC line 710 prevents current leakage that may otherwise occur if larger currents were employed. A representative pre-charging scheme is illustrated in FIG. 11, in accordance with some embodiments. For simplicity, only a portion of an EVSE is depicted in FIG. 11. As shown, an electrical path is formed in parallel to switch 711 and fuse 701. The parallel electrical path includes a fuse 1000, a resistor 1002 and a switch 1004. In the pre-charge phase, switch 1004 is activated and switch 711 is deactivated. As a result, current flowing from DC link 203 towards internal DC line 710 is scaled down by a factor that depends upon the resistance of resistor 1002. Thus, the amount of current is lower than the current that would have flown in the EVSE in the absence of the parallel, pre-charge path. This allows the voltage of the internal DC line 710 to be raised to the voltage of the DC link without incurring (or at least limiting) leakage. During regular operation of the EVSE, switch 1004 is deactivated.

X. Mobile Chargers

It should be noted that not all embodiments require that a DC link be connected to a utility POI. Some embodiments involve DC links that couple DC-DC converters together without the need to connect the DC link to a utility POI. The ability to operate the DC-coupled architectures of the types described herein independently of the grid enables charging schemes using portable EVSEs. A portable EVSE may be disposed in a relatively small housing, and may fit inside a vehicle. In this way, the vehicle may serve as a portable charging station.

Figure 12:
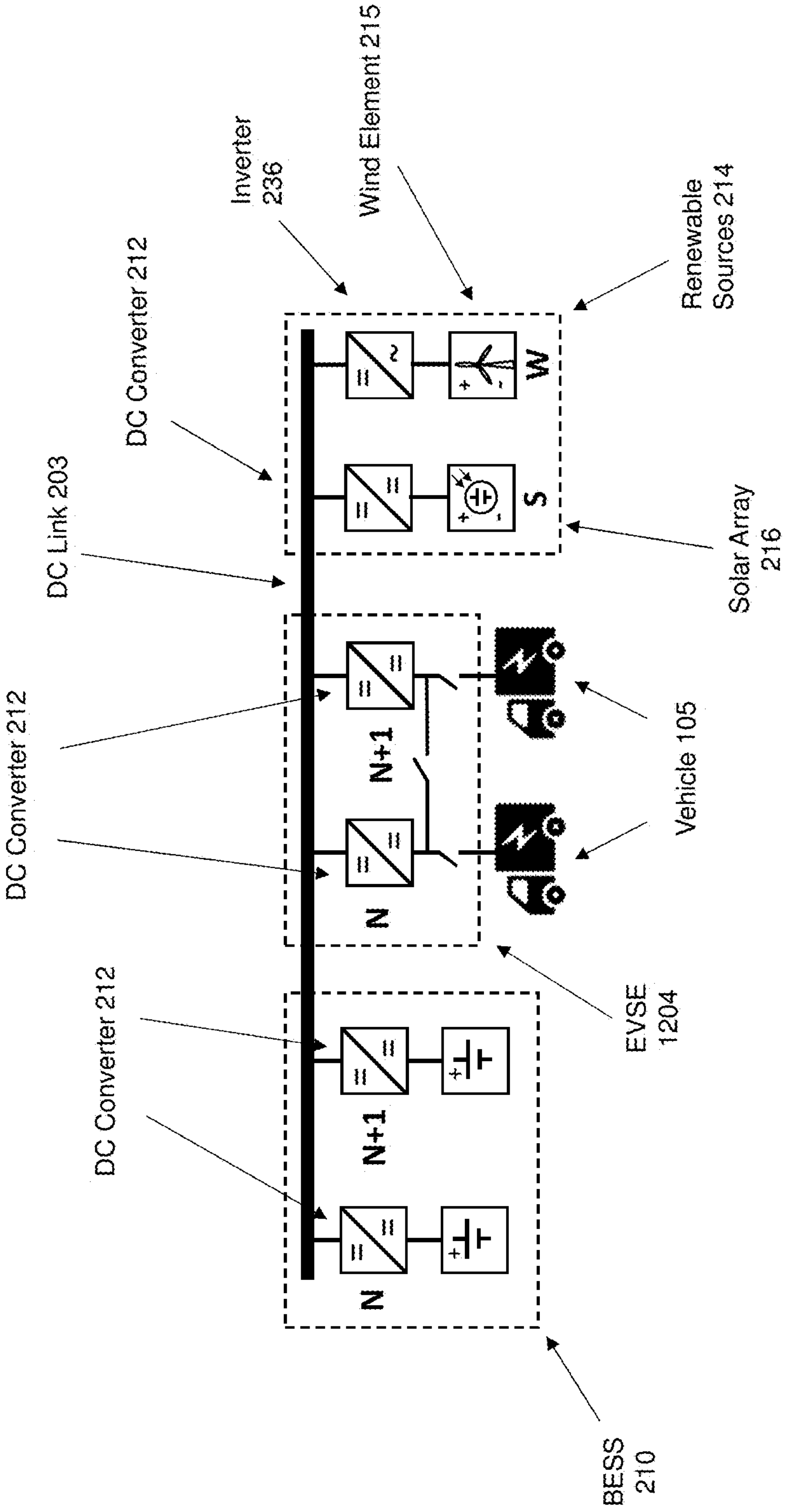
FIG. 12 is a block diagram illustrating a DC-coupled architecture using a portable EVSE, in accordance with some embodiments.

FIG. 12 is a block diagram illustrating an example of a DC-coupled architecture using a portable EVSE. The architecture of FIG. 12 is similar to the architecture of FIG. 2, but in this case DC link 203 is not connected to a utility POI. Therefore, transformer 102 and inverter 206 are omitted. Additionally, EVSE 204 is replaced with portable EVSE 1204. From a functional standpoint, EVSE 1204 may operate in the same way as described above in connection with EVSE 204. However, EVSE 1204 may be a portable version of EVSE 204. For example, EVSE 1204 may be disposed within a housing sufficiently small to fit inside a vehicle. The vehicle may serve as a portable station, and may be deployed as needed to charge batteries of other vehicles. In the example of FIG. 12, EVSE 1204 is connected to a DC link 203, which is also connected to renewable sources and a pair of BESS s. Using EVSE 1204, charging schemes similar to those described in connection with FIGS. 7B-7E and 8A-8C are possible.

XI. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The definitions, as defined and used herein, should be understood to control over dictionary definitions, definitions in documents incorporated by reference and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some case and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±10% of a target value in some embodiments. The terms "approximately," "substantially," and "about" may include the target value.

Use of ordinal terms such as "first," "second," "third," etc., in the claims to modify a claim element does not by itself connotate any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. An electric vehicle charging station (EVCS) comprising:

a direct current (DC) link;

a plurality of chargers coupled to the DC link, wherein at least one charger of the plurality of chargers comprises:

a first DC-DC converter and a second DC-DC converter, each of the first and second DC-DC converters having a link side coupled to the DC link and a vehicle side;

a first switch coupling the vehicle side of the first DC-DC converter to a first port of the at least one charger;

a second switch coupling the vehicle side of the second DC-DC converter to a second port of the at least one charger;

a third switch coupling the vehicle side of the first DC-DC converter to the second port of the at least one charger; and a fourth switch coupling the DC link to the link sides of the first and second DC-DC converters; and a controller configured to:

place the at least one charger in an independent charging mode by enabling the first and second switches, and by disabling the third switch, place the at least one charger in a parallel charging mode by enabling the first and third switches, and by disabling the second switch, and place the at least one charger in a vehicle-to-vehicle charging mode by enabling the first and second switches, and by disabling the third and fourth switches.

2. The EVCS of claim 1, wherein the first and second DC-DC converters provide galvanic isolation.

3. The EVCS of claim 1, wherein the first and second DC-DC converters comprise a wide bandgap material.

4. The EVCS of claim 3, wherein the first and second DC-DC converters comprise dual active bridges (DAB).

5. The EVCS of claim 1, further comprising a first fault detection unit coupled to the vehicle side of the first DC-DC converter and a second fault detection unit coupled to the vehicle side of the second DC-DC converter.

6. The EVCS of claim 5, further comprising a third fault detection unit coupled to the link sides of the first and second DC-DC converters.

7. The EVCS of claim 6, further comprising a fourth fault detection unit coupled to the DC link.

8. The EVCS of claim 1, wherein the DC link comprises a first cable having a first rating and a second cable having a second rating, wherein the EVCS further comprises a fuse connected between the first cable and the second cable.

9. The EVCS of claim 8, wherein the fuse is positioned in the charger.

10. The EVCS of claim 1, further comprising:

a transformer having a first side coupled to a point of interconnection (POI) and a second side; and an inverter coupled to the second side of the transformer, the inverter being configured to perform alternating current-direct current (AC-DC) conversion of power received from the transformer, wherein the DC link is coupler to the inverter.

11. A method for controlling an electric vehicle charging station (EVCS) comprising a direct current (DC) link, a plurality of chargers coupled to the DC link, wherein at least one charger of the plurality of chargers comprises a first DC-DC converter and a second DC-DC converter, each of the first and second DC-DC converters having a link side coupled to the DC link and a vehicle side, the method comprising:

placing the at least one charger in an independent charging mode by:

enabling a first switch coupling the vehicle side of the first DC-DC converter to a first port of the at least one charger, enabling a second switch coupling the vehicle side of the second DC-DC converter to a second port of the at least one charger, and disabling a third switch coupling the vehicle side of the first DC-DC converter to the second port of the at least one charger;

placing the at least one charger in a parallel charging mode by enabling the first and third switches, and by disabling the second switch; and placing the at least one charger in a vehicle-to-vehicle charging mode by enabling the first and second switches, and by disabling the third and a fourth switch that couples the DC link to the link sides of the first and second DC-DC converters.

12. The method of claim 11, wherein placing the at least one charger in the independent charging mode further comprises enabling the fourth switch.

13. The method of claim 11, wherein placing the at least one charger in the parallel charging mode further comprises enabling the fourth switch.

14. The method of claim 11, wherein placing the at least one charger in the parallel charging mode is performed subsequent to placing the at least one charger in the independent charging mode.

15. The method of claim 14, further comprising monitoring a charging state of a battery of a vehicle connected to the second port during the independent charging mode, wherein placing the at least one charger in the parallel charging mode is performed upon determining that the battery of the vehicle is sufficiently charged.

16. A method for controlling an electric vehicle charging station (EVCS) comprising a direct current (DC) link, a plurality of chargers coupled to the DC link, wherein at least one charger of the plurality of chargers comprises a first DC-DC converter and a second DC-DC converter, wherein the at least one charger of the plurality of chargers has first and second ports that can be connected to a respective vehicle, the method comprising:

placing the at least one charger in an independent charging mode by:

using the first DC-DC converter to charge a battery of a first vehicle connected to the first port, and using the second DC-DC converter to charge a battery of a second vehicle connected to the second port;

placing the at least one charger in a parallel charging mode by:

using the first DC-DC converter to charge a battery of a third vehicle connected to the first port, and using the second DC-DC converter to charge the battery of the third vehicle; and placing the at least one charger in a vehicle-to-vehicle charging mode by using the first and second DC-DC converters to charge a battery of a fourth vehicle connected to the first port from a battery of a fifth vehicle connected to the second port.

17. The method of claim 16, wherein placing the at least one charger in the parallel charging mode is performed subsequent to placing the at least one charger in the independent charging mode.

18. The method of claim 17, further comprising monitoring a charging state of the battery of the first vehicle connected to the first port during the independent charging mode, wherein placing the at least one charger in the parallel charging mode is performed upon determining that the battery of the first vehicle is sufficiently charged.

* * * * *